United States Patent
Noble et al.

(10) Patent No.: US 8,041,449 B2
(45) Date of Patent: Oct. 18, 2011

(54) BULK FEEDING DISK DRIVES TO DISK DRIVE TESTING SYSTEMS

(75) Inventors: Scott Noble, Denver, CO (US); Edward Garcia, Holbrook, MA (US); Evgeny Polyakov, Brookline, MA (US); Eric L. Truebenbach, Sudbury, MA (US); Brian S. Merrow, Harvard, MA (US)

(73) Assignee: Teradyne, Inc., North Reading, MA (US)

( * ) Notice: Subject to any disclaimer, the term of this patent is extended or adjusted under 35 U.S.C. 154(b) by 637 days.

(21) Appl. No.: 12/104,869

(22) Filed: Apr. 17, 2008

(65) Prior Publication Data

US 2009/0262445 A1 Oct. 22, 2009

(51) Int. Cl.
*G06F 7/00* (2011.01)
*G06F 19/00* (2006.01)
*G11B 15/18* (2006.01)
*G01K 13/00* (2006.01)

(52) U.S. Cl. ........ 700/213; 700/214; 700/215; 700/245; 360/71; 702/130

(58) Field of Classification Search .................. None
See application file for complete search history.

(56) References Cited

U.S. PATENT DOCUMENTS

| | | | |
|---|---|---|---|
| 557,186 A | 3/1896 | Cahill | |
| 2,224,407 A | 12/1940 | Passur | |
| 2,380,026 A | 7/1945 | Clarke | |
| 2,631,775 A | 3/1953 | Gordon | |
| 2,635,524 A | 4/1953 | Jenkins | |
| 3,120,166 A | 2/1964 | Lyman | 98/39 |
| 3,360,032 A | 12/1967 | Sherwood | |
| 3,364,838 A | 1/1968 | Bradley | |
| 3,517,601 A | 6/1970 | Courchesne | |
| 3,845,286 A | 10/1974 | Aronstein et al. | |
| 4,147,299 A | 4/1979 | Freeman | |
| 4,233,644 A | 11/1980 | Hwang et al. | 361/384 |
| 4,336,748 A | 6/1982 | Martin et al. | 98/33 |
| 4,379,259 A | 4/1983 | Varadi et al. | 324/73 |
| 4,477,127 A | 10/1984 | Kume | 312/8 |

(Continued)

FOREIGN PATENT DOCUMENTS

AU 583716 5/1989

(Continued)

OTHER PUBLICATIONS

Abraham et al., "Thermal Proximity Imaging of Hard-Disk Substrates", IEEE Transactions on Mathematics 36:3997-4004, Nov. 2000.

(Continued)

*Primary Examiner* — Gene Crawford
*Assistant Examiner* — Yolanda Cumbess
(74) *Attorney, Agent, or Firm* — Fish & Richardson P.C.

(57) ABSTRACT

A method of supplying disk drives to a disk drive testing system includes placing a disk drive tote, carrying multiple disk drives, in a presentation position accessible to an automated transporter of the disk drive testing system. The method includes actuating the automated transporter to retrieve one of the disk drives from the disk drive tote, and actuating the automated transporter to deliver the retrieved disk drive to a test slot of the disk drive testing system and insert the disk drive in the test slot.

53 Claims, 14 Drawing Sheets

U.S. PATENT DOCUMENTS

| | | | |
|---|---|---|---|
| 4,495,545 A | 1/1985 | Dufresne et al. | 361/384 |
| 4,526,318 A | 7/1985 | Fleming et al. | 236/49 |
| 4,620,248 A | 10/1986 | Gitzendanner | |
| 4,648,007 A | 3/1987 | Garner | 361/384 |
| 4,654,732 A | 3/1987 | Mesher | |
| 4,665,455 A | 5/1987 | Mesher | |
| 4,683,424 A | 7/1987 | Cutright et al. | |
| 4,685,303 A | 8/1987 | Branc et al. | 62/3 |
| 4,688,124 A | 8/1987 | Scribner et al. | |
| 4,713,714 A | 12/1987 | Gatti et al. | 360/137 |
| 4,739,444 A | 4/1988 | Zushi et al. | 361/383 |
| 4,754,397 A | 6/1988 | Varaiya et al. | 364/200 |
| 4,768,285 A | 9/1988 | Woodman, Jr. | |
| 4,778,063 A | 10/1988 | Ueberreiter | |
| 4,801,234 A | 1/1989 | Cedrone | |
| 4,809,881 A | 3/1989 | Becker | |
| 4,817,273 A | 4/1989 | Lape et al. | |
| 4,817,934 A | 4/1989 | McCormick et al. | |
| 4,851,965 A | 7/1989 | Gabuzda et al. | 361/383 |
| 4,881,591 A | 11/1989 | Rignall | 165/26 |
| 4,888,549 A | 12/1989 | Wilson et al. | 324/73 R |
| 4,911,281 A | 3/1990 | Jenkner | |
| 4,967,155 A | 10/1990 | Magnuson | 324/212 |
| 5,012,187 A | 4/1991 | Littlebury | 324/158 |
| 5,045,960 A | 9/1991 | Eding | |
| 5,061,630 A | 10/1991 | Knopf et al. | 435/290 |
| 5,119,270 A | 6/1992 | Bolton et al. | 361/384 |
| 5,122,914 A | 6/1992 | Hanson | 360/98.01 |
| 5,127,684 A | 7/1992 | Klotz et al. | 292/113 |
| 5,128,813 A | 7/1992 | Lee | |
| 5,136,395 A | 8/1992 | Ishii et al. | |
| 5,158,132 A | 10/1992 | Guillemot | 165/30 |
| 5,168,424 A | 12/1992 | Bolton et al. | 361/384 |
| 5,171,183 A | 12/1992 | Pollard et al. | 454/184 |
| 5,173,819 A | 12/1992 | Takahashi et al. | 360/97.03 |
| 5,176,202 A | 1/1993 | Richard | 165/48.1 |
| 5,205,132 A | 4/1993 | Fu | |
| 5,206,772 A | 4/1993 | Hirano et al. | |
| 5,207,613 A | 5/1993 | Ferchau et al. | 454/184 |
| 5,210,680 A | 5/1993 | Scheibler | 361/384 |
| 5,237,484 A | 8/1993 | Ferchau et al. | 361/689 |
| 5,263,537 A | 11/1993 | Plucinski et al. | 165/97 |
| 5,269,698 A | 12/1993 | Singer | 439/157 |
| 5,295,392 A | 3/1994 | Hensel et al. | |
| 5,309,323 A | 5/1994 | Gray et al. | 361/726 |
| 5,325,263 A | 6/1994 | Singer et al. | 361/683 |
| 5,349,486 A | 9/1994 | Sugimoto et al. | 360/97.01 |
| 5,368,072 A | 11/1994 | Cote | 137/872 |
| 5,374,395 A | 12/1994 | Robinson et al. | |
| 5,379,229 A | 1/1995 | Parsons et al. | |
| 5,398,058 A | 3/1995 | Hattori | |
| 5,412,534 A | 5/1995 | Cutts et al. | 361/695 |
| 5,414,591 A | 5/1995 | Kimura et al. | 361/695 |
| 5,426,581 A | 6/1995 | Kishi et al. | |
| 5,469,037 A | 11/1995 | McMurtrey, Sr. et al. | 318/626 |
| 5,477,416 A | 12/1995 | Schkrohowsky et al. | 361/695 |
| 5,484,012 A | 1/1996 | Hiratsuka | 165/40 |
| 5,486,681 A | 1/1996 | Dagnac et al. | |
| 5,491,610 A | 2/1996 | Mok et al. | 361/695 |
| 5,543,727 A | 8/1996 | Bushard et al. | |
| 5,546,250 A | 8/1996 | Diel | 360/97.02 |
| 5,557,186 A | 9/1996 | McMurtrey, Sr. et al. | 318/626 |
| 5,563,768 A | 10/1996 | Perdue | 361/695 |
| 5,570,740 A | 11/1996 | Flores et al. | |
| 5,593,380 A | 1/1997 | Bittikofer | |
| 5,601,141 A | 2/1997 | Gordon et al. | 165/263 |
| 5,604,662 A | 2/1997 | Anderson et al. | 361/685 |
| 5,610,893 A | 3/1997 | Soga et al. | 369/84 |
| 5,617,430 A | 4/1997 | Angelotti et al. | |
| 5,644,705 A | 7/1997 | Stanley | 395/183.18 |
| 5,646,918 A | 7/1997 | Dimitri et al. | |
| 5,654,846 A | 8/1997 | Wicks et al. | 360/97.01 |
| 5,673,029 A | 9/1997 | Behl et al. | 340/635 |
| 5,694,290 A | 12/1997 | Chang | 361/685 |
| 5,718,627 A | 2/1998 | Wicks | 454/68 |
| 5,718,628 A | 2/1998 | Nakazato et al. | 454/184 |
| 5,729,464 A * | 3/1998 | Dimitri | 700/215 |
| 5,731,928 A | 3/1998 | Jabbari et al. | |
| 5,751,549 A | 5/1998 | Eberhardt et al. | 361/687 |
| 5,754,365 A | 5/1998 | Beck et al. | |
| 5,761,032 A | 6/1998 | Jones | 361/685 |
| 5,793,610 A | 8/1998 | Schmitt et al. | 361/695 |
| 5,811,678 A | 9/1998 | Hirano | 73/461 |
| 5,812,761 A | 9/1998 | Seki et al. | 395/185.07 |
| 5,818,723 A * | 10/1998 | Dimitri | 700/214 |
| 5,819,842 A | 10/1998 | Potter et al. | 165/206 |
| 5,831,525 A | 11/1998 | Harvey | 340/507 |
| 5,851,143 A | 12/1998 | Hamid | 454/57 |
| 5,859,409 A | 1/1999 | Kim et al. | 219/400 |
| 5,859,540 A | 1/1999 | Fukumoto | 324/760 |
| 5,862,037 A | 1/1999 | Behl | 361/687 |
| 5,870,630 A | 2/1999 | Reasoner et al. | 395/894 |
| 5,886,639 A | 3/1999 | Behl et al. | 340/635 |
| 5,890,959 A | 4/1999 | Pettit et al. | 454/184 |
| 5,912,799 A | 6/1999 | Grouell et al. | 361/685 |
| 5,913,926 A | 6/1999 | Anderson et al. | 714/6 |
| 5,914,856 A | 6/1999 | Morton et al. | 361/690 |
| 5,927,386 A | 7/1999 | Lin | 165/80.3 |
| 5,956,301 A | 9/1999 | Dimitri et al. | |
| 5,959,834 A | 9/1999 | Chang | 361/685 |
| 5,999,356 A | 12/1999 | Dimitri et al. | 360/71 |
| 5,999,365 A | 12/1999 | Hasegawa et al. | 360/97.02 |
| 6,000,623 A | 12/1999 | Blatti et al. | 236/49.3 |
| 6,005,404 A | 12/1999 | Cochran et al. | 324/760 |
| 6,005,770 A | 12/1999 | Schmitt | 361/695 |
| 6,008,636 A | 12/1999 | Miller et al. | |
| 6,008,984 A | 12/1999 | Cunningham et al. | 361/685 |
| 6,011,689 A | 1/2000 | Wrycraft | 361/695 |
| 6,031,717 A | 2/2000 | Baddour et al. | 361/687 |
| 6,034,870 A | 3/2000 | Osborn et al. | 361/690 |
| 6,042,348 A | 3/2000 | Aakalu et al. | 417/423.5 |
| 6,045,113 A | 4/2000 | Itakura | |
| 6,055,814 A | 5/2000 | Song | |
| 6,066,822 A | 5/2000 | Nemoto et al. | |
| 6,067,225 A | 5/2000 | Reznikov et al. | 361/685 |
| 6,069,792 A | 5/2000 | Nelik | 361/687 |
| 6,084,768 A | 7/2000 | Bologna | 361/685 |
| 6,094,342 A | 7/2000 | Dague et al. | 361/685 |
| 6,104,607 A | 8/2000 | Behl | 361/687 |
| 6,115,250 A | 9/2000 | Schmitt | 361/695 |
| 6,122,131 A | 9/2000 | Jeppson | |
| 6,122,232 A | 9/2000 | Schell et al. | |
| 6,124,707 A | 9/2000 | Kim et al. | 324/158.1 |
| 6,130,817 A | 10/2000 | Flotho et al. | 361/685 |
| 6,144,553 A | 11/2000 | Hileman et al. | 361/687 |
| 6,166,901 A | 12/2000 | Gamble et al. | 361/685 |
| 6,169,413 B1 | 1/2001 | Paek et al | |
| 6,169,930 B1 | 1/2001 | Blachek et al. | |
| 6,177,805 B1 | 1/2001 | Pih | 324/754 |
| 6,178,835 B1 | 1/2001 | Orriss et al. | 73/865.9 |
| 6,181,557 B1 | 1/2001 | Gatti | 361/695 |
| 6,185,065 B1 | 2/2001 | Hasegawa et al. | 360/97.02 |
| 6,185,097 B1 | 2/2001 | Behl | 361/695 |
| 6,188,191 B1 | 2/2001 | Frees et al. | |
| 6,192,282 B1 | 2/2001 | Smith et al. | |
| 6,193,339 B1 | 2/2001 | Behl et al. | 312/223.2 |
| 6,209,842 B1 | 4/2001 | Anderson et al. | 248/560 |
| 6,227,516 B1 | 5/2001 | Webster, Jr. et al. | 248/694 |
| 6,229,275 B1 | 5/2001 | Yamamoto | |
| 6,231,145 B1 | 5/2001 | Liu | 312/332.1 |
| 6,233,148 B1 | 5/2001 | Shen | |
| 6,236,563 B1 | 5/2001 | Buican et al. | 361/685 |
| 6,247,944 B1 | 6/2001 | Bologna et al. | 439/157 |
| 6,249,824 B1 | 6/2001 | Henrichs | |
| 6,252,769 B1 | 6/2001 | Tullstedt et al. | 361/694 |
| 6,262,863 B1 | 7/2001 | Ostwald et al. | |
| 6,272,007 B1 | 8/2001 | Kitlas et al. | |
| 6,272,767 B1 | 8/2001 | Botruff et al. | |
| 6,281,677 B1 | 8/2001 | Cosci et al. | 324/212 |
| 6,282,501 B1 | 8/2001 | Assouad | 702/117 |
| 6,285,524 B1 | 9/2001 | Boigenzahn et al. | |
| 6,289,678 B1 | 9/2001 | Pandolfi | 62/3.2 |
| 6,297,950 B1 | 10/2001 | Erwin | 361/685 |
| 6,298,672 B1 | 10/2001 | Valicoff, Jr. | |
| 6,302,714 B1 | 10/2001 | Bologna et al. | 439/157 |
| 6,304,839 B1 | 10/2001 | Ho et al. | 703/18 |
| 6,307,386 B1 | 10/2001 | Fowler et al. | |

| Patent No. | Date | Inventor(s) | Class |
|---|---|---|---|
| 6,327,150 B1 | 12/2001 | Levy et al. | 361/724 |
| 6,330,154 B1 | 12/2001 | Fryers et al. | 361/695 |
| 6,351,379 B1 | 2/2002 | Cheng | 361/685 |
| 6,354,792 B1 | 3/2002 | Kobayashi et al. | |
| 6,356,409 B1 | 3/2002 | Price et al. | 360/98.07 |
| 6,356,415 B1 | 3/2002 | Kabasawa | 360/256.3 |
| 6,384,995 B1 | 5/2002 | Smith | 360/31 |
| 6,388,437 B1 | 5/2002 | Wolski et al. | |
| 6,388,875 B1 | 5/2002 | Chen | 361/685 |
| 6,388,878 B1 | 5/2002 | Chang | 361/687 |
| 6,389,225 B1 | 5/2002 | Malinoski et al. | 392/479 |
| 6,411,584 B2 | 6/2002 | Davis et al. | |
| 6,421,236 B1 | 7/2002 | Montoya et al. | 361/685 |
| 6,434,000 B1 | 8/2002 | Pandolfi | 361/685 |
| 6,434,498 B1 | 8/2002 | Ulrich et al. | 702/115 |
| 6,434,499 B1 | 8/2002 | Ulrich et al. | 702/115 |
| 6,464,080 B1 | 10/2002 | Morris et al. | 306/591 |
| 6,467,153 B2 | 10/2002 | Butts et al. | 29/603.03 |
| 6,473,297 B1 | 10/2002 | Behl et al. | 361/685 |
| 6,473,301 B1 | 10/2002 | Levy et al. | 361/685 |
| 6,476,627 B1 | 11/2002 | Pelissier et al. | 324/760 |
| 6,477,044 B2 | 11/2002 | Foley et al. | |
| 6,477,442 B1 | 11/2002 | Valerino, Sr. | |
| 6,480,380 B1 | 11/2002 | French et al. | 361/690 |
| 6,480,382 B1 | 11/2002 | Cheng | 361/695 |
| 6,487,071 B1 | 11/2002 | Tata et al. | 361/685 |
| 6,489,793 B2 | 12/2002 | Jones et al. | 324/760 |
| 6,494,663 B2 | 12/2002 | Ostwald et al. | |
| 6,525,933 B2 | 2/2003 | Eland | 361/686 |
| 6,526,841 B1 | 3/2003 | Wanek et al. | 73/865.6 |
| 6,535,384 B2 | 3/2003 | Huang | 361/695 |
| 6,537,013 B2 | 3/2003 | Emberty et al. | |
| 6,544,309 B1 | 4/2003 | Hoefer et al. | 55/283 |
| 6,546,445 B1 | 4/2003 | Hayes | 710/305 |
| 6,553,532 B1 | 4/2003 | Aoki | |
| 6,560,107 B1 | 5/2003 | Beck et al. | |
| 6,565,163 B2 | 5/2003 | Behl et al. | 312/223.1 |
| 6,566,859 B2 | 5/2003 | Wolski et al. | 324/158.1 |
| 6,567,266 B2 | 5/2003 | Ives et al. | |
| 6,570,734 B2 | 5/2003 | Ostwald et al. | |
| 6,577,586 B1 | 6/2003 | Yang et al. | |
| 6,577,687 B2 | 6/2003 | Hall et al. | |
| 6,618,254 B2 | 9/2003 | Ives | |
| 6,626,846 B2 | 9/2003 | Spencer | |
| 6,628,518 B2 | 9/2003 | Behl et al. | 361/687 |
| 6,635,115 B1 | 10/2003 | Fairbairn et al. | |
| 6,640,235 B1 | 10/2003 | Anderson | 708/100 |
| 6,644,982 B2 | 11/2003 | Ondricek et al. | |
| 6,651,192 B1 | 11/2003 | Viglione et al. | 714/47 |
| 6,654,240 B1 | 11/2003 | Tseng et al. | 361/685 |
| 6,679,128 B2 | 1/2004 | Wanek et al. | 73/865.6 |
| 6,693,757 B2 | 2/2004 | Hayakawa et al. | 360/69 |
| 6,741,529 B1 | 5/2004 | Getreuer | |
| 6,746,648 B1 | 6/2004 | Mattila et al. | |
| 6,751,093 B1 | 6/2004 | Hsu et al. | 361/685 |
| 6,791,785 B1 | 9/2004 | Messenger et al. | |
| 6,791,799 B2 | 9/2004 | Fletcher | 360/255 |
| 6,798,651 B2 | 9/2004 | Syring et al. | 361/685 |
| 6,798,972 B1 | 9/2004 | Ito et al. | |
| 6,801,834 B1 | 10/2004 | Konshak et al. | |
| 6,806,700 B2 | 10/2004 | Wanek et al. | 324/158.1 |
| 6,811,427 B2 | 11/2004 | Garrett et al. | 439/378 |
| 6,826,046 B1 | 11/2004 | Muncaster et al. | 361/687 |
| 6,830,372 B2 | 12/2004 | Liu et al. | 374/57 |
| 6,832,929 B2 | 12/2004 | Garrett et al. | 439/378 |
| 6,861,861 B2 | 3/2005 | Song et al. | |
| 6,862,173 B1 | 3/2005 | Konshak et al. | |
| 6,867,939 B2 | 3/2005 | Katahara et al. | 360/53 |
| 6,892,328 B2 | 5/2005 | Klein et al. | 714/42 |
| 6,904,479 B2 | 6/2005 | Hall et al. | |
| 6,908,330 B2 | 6/2005 | Garrett et al. | 439/378 |
| 6,928,336 B2 | 8/2005 | Peshkin et al. | |
| 6,937,432 B2 | 8/2005 | Sri-Jayantha et al. | 360/97.01 |
| 6,957,291 B2 | 10/2005 | Moon et al. | |
| 6,965,811 B2 | 11/2005 | Dickey et al. | |
| 6,974,017 B2 | 12/2005 | Oseguera | |
| 6,976,190 B1 | 12/2005 | Goldstone | 714/42 |
| 6,980,381 B2 | 12/2005 | Gray et al. | 360/31 |
| 6,982,872 B2 | 1/2006 | Behl et al. | 361/687 |
| 7,006,325 B2 | 2/2006 | Emberty et al. | |
| 7,039,924 B2 | 5/2006 | Goodman et al. | |
| 7,054,150 B2 * | 5/2006 | Orriss et al. | 361/679.33 |
| 7,070,323 B2 | 7/2006 | Wanek et al. | 374/45 |
| 7,076,391 B1 | 7/2006 | Pakzad et al. | 702/118 |
| 7,077,614 B1 | 7/2006 | Hasper et al. | |
| 7,088,541 B2 * | 8/2006 | Orriss et al. | 360/71 |
| 7,092,251 B1 | 8/2006 | Henry | 361/685 |
| 7,106,582 B2 | 9/2006 | Albrecht et al. | 361/685 |
| 7,123,477 B2 | 10/2006 | Coglitore et al. | |
| 7,126,777 B2 | 10/2006 | Flechsig et al. | 360/59 |
| 7,130,138 B2 | 10/2006 | Lum et al. | 360/31 |
| 7,134,553 B2 | 11/2006 | Stephens | |
| 7,139,145 B1 | 11/2006 | Archibald et al. | 360/53 |
| 7,164,579 B2 | 1/2007 | Muncaster et al. | 361/685 |
| 7,167,360 B2 | 1/2007 | Inoue et al. | |
| 7,181,458 B1 | 2/2007 | Higashi | |
| 7,203,021 B1 | 4/2007 | Ryan et al. | |
| 7,203,060 B2 | 4/2007 | Kay et al. | 361/685 |
| 7,206,201 B2 | 4/2007 | Behl et al. | |
| 7,216,968 B2 | 5/2007 | Smith et al. | |
| 7,219,028 B2 | 5/2007 | Bae et al. | |
| 7,219,273 B2 | 5/2007 | Fisher et al. | |
| 7,227,746 B2 | 6/2007 | Tanaka et al. | 361/685 |
| 7,232,101 B2 | 6/2007 | Wanek et al. | 248/346.06 |
| 7,243,043 B2 | 7/2007 | Shin | |
| 7,248,467 B2 | 7/2007 | Sri-Jayantha et al. | 361/685 |
| 7,259,966 B2 | 8/2007 | Connelly, Jr. et al. | 361/727 |
| 7,273,344 B2 | 9/2007 | Ostwald et al. | |
| 7,280,353 B2 | 10/2007 | Wendel et al. | |
| 7,289,885 B2 | 10/2007 | Basham et al. | |
| 7,304,855 B1 | 12/2007 | Milligan et al. | 361/724 |
| 7,315,447 B2 | 1/2008 | Inoue et al. | |
| 7,349,205 B2 | 3/2008 | Hall et al. | |
| 7,353,524 B1 | 4/2008 | Lin et al. | |
| 7,385,385 B2 | 6/2008 | Magliocco et al. | |
| 7,395,133 B2 | 7/2008 | Lowe | |
| 7,403,451 B2 | 7/2008 | Goodman et al. | |
| 7,437,212 B2 | 10/2008 | Farchmin et al. | |
| 7,447,011 B2 | 11/2008 | Wade et al. | |
| 7,457,112 B2 | 11/2008 | Fukuda et al. | |
| 7,467,024 B2 | 12/2008 | Flitsch | |
| 7,476,362 B2 | 1/2009 | Angros | 422/100 |
| 7,483,269 B2 | 1/2009 | Marvin, Jr. et al. | |
| 7,505,264 B2 | 3/2009 | Hall et al. | |
| 7,554,811 B2 | 6/2009 | Scicluna et al. | |
| 7,568,122 B2 | 7/2009 | Mechalke et al. | |
| 7,570,455 B2 | 8/2009 | Deguchi et al. | |
| 7,573,715 B2 | 8/2009 | Mojaver et al. | |
| 7,584,851 B2 | 9/2009 | Hong et al. | |
| 7,612,996 B2 | 11/2009 | Atkins et al. | |
| 7,625,027 B2 | 12/2009 | Kiaie et al. | |
| 7,630,196 B2 | 12/2009 | Hall et al. | |
| 7,643,289 B2 | 1/2010 | Ye et al. | |
| 7,646,596 B2 | 1/2010 | Ng | |
| 2001/0006453 A1 | 7/2001 | Glorioso et al. | 361/685 |
| 2001/0044023 A1 | 11/2001 | Johnson et al. | |
| 2001/0046118 A1 | 11/2001 | Yamanashi et al. | 361/687 |
| 2001/0048590 A1 | 12/2001 | Behl et al. | |
| 2002/0030981 A1 | 3/2002 | Sullivan et al. | |
| 2002/0044416 A1 | 4/2002 | Harmon, III et al. | 361/685 |
| 2002/0051338 A1 | 5/2002 | Jiang et al. | |
| 2002/0071248 A1 | 6/2002 | Huang et al. | 361/685 |
| 2002/0079422 A1 | 6/2002 | Jiang | |
| 2002/0090320 A1 | 7/2002 | Burow et al. | |
| 2002/0116087 A1 | 8/2002 | Brown | |
| 2002/0161971 A1 | 10/2002 | Dimitri et al. | 711/114 |
| 2002/0172004 A1 | 11/2002 | Ives et al. | 361/685 |
| 2003/0035271 A1 | 2/2003 | Lelong et al. | 361/724 |
| 2003/0043550 A1 | 3/2003 | Ives | 361/726 |
| 2003/0206397 A1 | 11/2003 | Allgeyer et al. | 361/685 |
| 2004/0165489 A1* | 8/2004 | Goodman et al. | 369/30.42 |
| 2004/0230399 A1 | 11/2004 | Shin | 702/182 |
| 2004/0236465 A1 | 11/2004 | Butka et al. | |
| 2004/0264121 A1 | 12/2004 | Orriss et al. | 361/685 |
| 2005/0004703 A1* | 1/2005 | Christie, Jr. | 700/214 |
| 2005/0010836 A1 | 1/2005 | Bae et al. | 714/25 |
| 2005/0018397 A1 | 1/2005 | Kay et al. | 361/685 |
| 2005/0055601 A1 | 3/2005 | Wilson et al. | |

| | | | | | |
|---|---|---|---|---|---|
| 2005/0057849 A1 | 3/2005 | Twogood et al. | EP | 741508 | 11/1996 |
| 2005/0069400 A1 | 3/2005 | Dickey et al. | EP | 0757320 | 2/1997 |
| 2005/0109131 A1 | 5/2005 | Wanek et al. ............... 73/865.9 | EP | 0757351 | 2/1997 |
| 2005/0116702 A1 | 6/2005 | Wanek et al. ............... 324/158.1 | EP | 0840476 | 5/1998 |
| 2005/0131578 A1 | 6/2005 | Weaver | EP | 1 045 301 | 10/2000 |
| 2005/0179457 A1 | 8/2005 | Min et al. | EP | 1 045 301 A | 10/2000 |
| 2005/0207059 A1 | 9/2005 | Cochrane | EP | 1209557 | 5/2002 |
| 2005/0219809 A1 | 10/2005 | Muncaster et al. | EP | 1 422 713 | 5/2004 |
| 2005/0225338 A1 | 10/2005 | Sands et al. ................. 324/754 | EP | 1422713 | 5/2004 |
| 2005/0270737 A1 | 12/2005 | Wilson et al. ................. 361/685 | EP | 1234308 | 5/2006 |
| 2006/0023331 A1 | 2/2006 | Flechsig et al. | EP | 1 760 722 | 3/2007 |
| 2006/0028802 A1 | 2/2006 | Shaw et al. .................. 361/728 | EP | 1760722 | 3/2007 |
| 2006/0066974 A1 | 3/2006 | Akamatsu et al. | EP | 1612798 | 11/2007 |
| 2006/0130316 A1 | 6/2006 | Takase et al. ............... 29/603.09 | GB | 2241118 | 8/1991 |
| 2006/0190205 A1 | 8/2006 | Klein et al. | GB | 2276275 | 9/1994 |
| 2006/0227517 A1 | 10/2006 | Zayas et al. ................... 361/748 | GB | 2299436 | 10/1996 |
| 2006/0250766 A1 | 11/2006 | Blaalid et al. ................ 361/685 | GB | 2 312 984 | 11/1997 |
| 2006/0269384 A1 | 11/2006 | Kiaie et al. ............... 414/222.02 | GB | 2312984 | 11/1997 |
| 2007/0034368 A1 | 2/2007 | Atkins et al. .................. 165/247 | GB | 2328782 | 3/1999 |
| 2007/0035874 A1 | 2/2007 | Wendel et al. | GB | 2439844 | 7/2008 |
| 2007/0035875 A1 | 2/2007 | Hall et al. | JP | 61-115279 | 6/1986 |
| 2007/0053154 A1 | 3/2007 | Fukuda et al. | JP | 62-177621 | 8/1987 |
| 2007/0082907 A1 | 4/2007 | Canada et al. | JP | 62-239394 | 10/1987 |
| 2007/0127202 A1 | 6/2007 | Scicluna et al. ............... 361/685 | JP | 62-251915 | 11/1987 |
| 2007/0127206 A1 | 6/2007 | Wade et al. ................... 361/687 | JP | 63-002160 | 1/1988 |
| 2007/0195497 A1 | 8/2007 | Atkins ......................... 361/685 | JP | 63-004483 | 1/1988 |
| 2007/0248142 A1 | 10/2007 | Rountree et al. | JP | 63-016482 | 1/1988 |
| 2007/0253157 A1* | 11/2007 | Atkins et al. .................. 361/685 | JP | 63-062057 | 3/1988 |
| 2007/0286045 A1 | 12/2007 | Onagi et al. | JP | 63-201946 | 8/1988 |
| 2008/0007865 A1 | 1/2008 | Orriss et al. ................. 360/97.01 | JP | 63-214972 | 9/1988 |
| 2008/0030945 A1 | 2/2008 | Mojaver et al. | JP | 63-269376 | 11/1988 |
| 2008/0112075 A1 | 5/2008 | Farquhar et al. ........... 360/97.02 | JP | 63-195697 | 12/1988 |
| 2008/0239564 A1 | 10/2008 | Farquhar et al. ........... 360/97.02 | JP | 64-089034 | 4/1989 |
| 2008/0282275 A1 | 11/2008 | Zaczek et al. | JP | 2-091565 | 3/1990 |
| 2008/0282278 A1 | 11/2008 | Barkley | JP | 2-098197 | 4/1990 |
| 2009/0028669 A1 | 1/2009 | Rebstock | JP | 2-185784 | 7/1990 |
| 2009/0082907 A1 | 3/2009 | Stuvel et al. | JP | 2-199690 | 8/1990 |
| 2009/0122443 A1 | 5/2009 | Farquhar et al. | JP | 2-278375 | 11/1990 |
| 2009/0142169 A1 | 6/2009 | Garcia et al. | JP | 2-297770 | 12/1990 |
| 2009/0153992 A1 | 6/2009 | Garcia et al. | JP | 3-008086 | 1/1991 |
| 2009/0153993 A1 | 6/2009 | Garcia et al. | JP | 3-078160 | 4/1991 |
| 2009/0153994 A1 | 6/2009 | Merrow | JP | 3-105704 | 5/1991 |
| 2009/0175705 A1 | 7/2009 | Nakao et al. | JP | 3-207947 | 9/1991 |
| 2009/0261047 A1 | 10/2009 | Merrow | JP | 3-210662 | 9/1991 |
| 2009/0261228 A1 | 10/2009 | Merrow | JP | 3-212859 | 9/1991 |
| 2009/0261229 A1 | 10/2009 | Merrow | JP | 3-214490 | 9/1991 |
| 2009/0262444 A1 | 10/2009 | Polyakov et al. | JP | 3-240821 | 10/1991 |
| 2009/0262445 A1 | 10/2009 | Noble et al. | JP | 3-295071 | 12/1991 |
| 2009/0262454 A1 | 10/2009 | Merrow | JP | 4-017134 | 1/1992 |
| 2009/0262455 A1 | 10/2009 | Merrow | JP | 4-143989 | 5/1992 |
| 2009/0265032 A1 | 10/2009 | Toscano et al. | JP | 4-172658 | 6/1992 |
| 2009/0265043 A1 | 10/2009 | Merrow | JP | 4-214288 | 8/1992 |
| 2009/0265136 A1 | 10/2009 | Garcia et al. | JP | 4-247385 | 9/1992 |
| 2009/0297328 A1 | 12/2009 | Slocum, III | JP | 4-259956 | 9/1992 |
| | | | JP | 4-307440 | 10/1992 |
| | FOREIGN PATENT DOCUMENTS | | JP | 4-325923 | 11/1992 |
| CN | 1177187 | 3/1998 | JP | 5-035053 | 2/1993 |
| CN | 2341188 | 9/1999 | JP | 5-035415 | 2/1993 |
| CN | 1114109 | 7/2003 | JP | 5-066896 | 3/1993 |
| CN | 1192544 | 3/2005 | JP | 5-068257 | 3/1993 |
| DE | 3786944 | 11/1993 | JP | 5-073566 | 3/1993 |
| DE | 69111634 | 5/1996 | JP | 5-073803 | 3/1993 |
| DE | 69400145 | 10/1996 | JP | 5-101603 | 4/1993 |
| DE | 19701548 | 8/1997 | JP | 5-173718 | 7/1993 |
| DE | 19804813 | 9/1998 | JP | 5-189163 | 7/1993 |
| DE | 69614460 | 6/2002 | JP | 5-204725 | 8/1993 |
| DE | 69626584 | 12/2003 | JP | 5-223551 | 8/1993 |
| DE | 19861388 | 8/2007 | JP | 6-004220 | 1/1994 |
| EP | 0210497 | 7/1986 | JP | 6-004981 | 1/1994 |
| EP | 0242970 | 10/1987 | JP | 6-162645 | 6/1994 |
| EP | 0 277 634 | 8/1988 | JP | 6-181561 | 6/1994 |
| EP | 0 277 634 A | 8/1988 | JP | 6-215515 | 8/1994 |
| EP | 0356977 | 8/1989 | JP | 6-274943 | 9/1994 |
| EP | 0442642 | 2/1991 | JP | 6-314173 | 11/1994 |
| EP | 0466073 | 7/1991 | JP | 7-007321 | 1/1995 |
| EP | 0776009 | 11/1991 | JP | 7-029364 | 1/1995 |
| EP | 0582017 | 2/1994 | JP | 7-037376 | 2/1995 |
| EP | 0617570 | 9/1994 | JP | 7-056654 | 3/1995 |
| EP | 0635836 | 1/1995 | JP | 7-111078 | 4/1995 |

| | | |
|---|---|---|
| JP | 7-115497 | 5/1995 |
| JP | 7-201082 | 8/1995 |
| JP | 7-226023 | 8/1995 |
| JP | 7-230669 | 8/1995 |
| JP | 7-257525 | 10/1995 |
| JP | 1982246 | 10/1995 |
| JP | 7-307059 | 11/1995 |
| JP | 8007994 | 1/1996 |
| JP | 8-030398 | 2/1996 |
| JP | 8-030407 | 2/1996 |
| JP | 8-079672 | 3/1996 |
| JP | 8-106776 | 4/1996 |
| JP | 8-110821 | 4/1996 |
| JP | 8-167231 | 6/1996 |
| JP | 8-212015 | 8/1996 |
| JP | 8-244313 | 9/1996 |
| JP | 8-263525 | 10/1996 |
| JP | 8-263909 | 10/1996 |
| JP | 8-297957 | 11/1996 |
| JP | 2553315 | 11/1996 |
| JP | 9-044445 | 2/1997 |
| JP | 9-064571 | 3/1997 |
| JP | 9-082081 | 3/1997 |
| JP | 2635127 | 7/1997 |
| JP | 9-306094 | 11/1997 |
| JP | 9-319466 | 12/1997 |
| JP | 10-040021 | 2/1998 |
| JP | 10-049365 | 2/1998 |
| JP | 10-064173 | 3/1998 |
| JP | 10-098521 | 4/1998 |
| JP | 2771297 | 7/1998 |
| JP | 10-275137 | 10/1998 |
| JP | 10-281799 | 10/1998 |
| JP | 10-320128 | 12/1998 |
| JP | 10-340139 | 12/1998 |
| JP | 2862679 | 3/1999 |
| JP | 11-134852 | 5/1999 |
| JP | 11-139839 | 5/1999 |
| JP | 2906930 | 6/1999 |
| JP | 11-203201 | 7/1999 |
| JP | 11-213182 | 8/1999 |
| JP | 11-327800 | 11/1999 |
| JP | 11-353128 | 12/1999 |
| JP | 11-353129 | 12/1999 |
| JP | 2000-056935 | 2/2000 |
| JP | 2000-066845 | 3/2000 |
| JP | 2000-112831 | 4/2000 |
| JP | 2000-113563 | 4/2000 |
| JP | 2000-114759 | 4/2000 |
| JP | 2000-125290 | 4/2000 |
| JP | 3052183 | 4/2000 |
| JP | 2000-132704 | 5/2000 |
| JP | 2000-149431 | 5/2000 |
| JP | 2000-228686 | 8/2000 |
| JP | 2000-235762 | 8/2000 |
| JP | 2000-236188 | 8/2000 |
| JP | 2000-242598 | 9/2000 |
| JP | 2000-278647 | 10/2000 |
| JP | 3097994 | 10/2000 |
| JP | 2000-305860 | 11/2000 |
| JP | 2001-005501 | 1/2001 |
| JP | 2001-023270 | 1/2001 |
| JP | 2001-100925 | 4/2001 |
| JP | 2002-42446 | 2/2002 |
| JP | 2007-87498 | 4/2007 |
| JP | 2007-188615 | 7/2007 |
| JP | 2007-220184 | 8/2007 |
| JP | 2007 220184 | 8/2007 |
| JP | 2007-293936 | 11/2007 |
| JP | 2007-305206 | 11/2007 |
| JP | 2007-305290 | 11/2007 |
| JP | 2007-328761 | 12/2007 |
| JP | 2008-503824 | 2/2008 |
| KR | 10-1998-0035445 | 8/1998 |
| KR | 10-0176527 | 11/1998 |
| KR | 10-0214308 | 8/1999 |
| KR | 10-0403039 | 10/2003 |
| SG | 45223 | 1/1998 |
| TW | 387574 | 4/2000 |
| WO | WO 89/01682 | 8/1988 |
| WO | WO 97/06532 | 2/1997 |
| WO | WO 00/49487 | 2/2000 |
| WO | WO 00/67253 | 11/2000 |
| WO | WO 01/09627 | 2/2001 |
| WO | WO 01/41148 | 6/2001 |
| WO | WO 03/013783 | 2/2003 |
| WO | WO 03/021597 | 3/2003 |
| WO | WO 03/021598 | 3/2003 |
| WO | WO 03/067385 | 8/2003 |
| WO | WO 2004/006260 | 1/2004 |
| WO | WO 2004/114286 | 12/2004 |
| WO | WO 2005/024830 | 3/2005 |
| WO | WO 2005/024831 | 3/2005 |
| WO | WO 2005/109131 | 11/2005 |
| WO | WO 2006/030185 | 3/2006 |
| WO | WO 2006/048611 | 5/2006 |
| WO | WO 2006/100441 | 9/2006 |
| WO | WO 2006/100445 | 9/2006 |
| WO | WO 2007/031729 | 3/2007 |

OTHER PUBLICATIONS

Anderson et al., "High Reliability Variable Load Time Controllable Vibration Free Thermal Processing Environment", Delphion, hhttps://www.delphion.com/tdbs/tdb?order=93A+63418, 3 pages, Mar. 18, 2009.

Asbrand, "Engineers at One Company Share the Pride and the Profits of Successful Product Design", Professional Issues, 4 pages, 1987.

Bair et al., "Measurements of Asperity Temperatures of a Read/Write Head Slider Bearing in Hard Magnetic Recording Disks", Journal of Tribology 113:547-554, Jul. 1991.

Christensen, "How Can Great firms Fail? Insights from the hard Disk Drive Industry", Harvard Business School Press, pp. 1-26, 2006.

Haddad et al., "A new Mounting Adapter for Computer Peripherals with Improved Reliability, Thermal Distribution, Low Noise and Vibration Reduction", ISPS, Advances in Information Storage and Processing Systems, 1:97-108, 1995.

HighBeam Research website "ACT debuts six-zone catalytic gas heater. (American Catalytic Technologies offers new heaters)" www.highbeam.com, 4 pages, 1998.

HighBeam Research website "Asynchronous Testing Increases Throughput." www.highbeam.com, 7 pages, 2000.

HighBeam Research website "Credence announces Production Release of the EPRO AQ Series for Integrated Test and Back-end Processing." www.highbeam.com, 4 pages, 1995.

HighBeam Research website "Test Multiple Parts At Once for Air Leaks. (Brief Article)", www.highbeam.com, 1 page, 1999.

Iwamiya, "Hard Drive Cooling Using a Thermoelectric Cooler", EEP-vol. 19-2, Advances in Electronic Packaging, vol. 2:2203-2208, ASME 1997.

Ku, "Investigation of Hydrodynamic Bearing Friction in Data Storage information System Spindle Motors", ISPSvol. 1, Advances in Information Storage and Processing Systems, pp. 159-165, ASME 1995.

McAuley, "Recursive Time Trapping for Synchronization of Product and CHAMBER Profiles for Stree Test", Delphion, www.delphion.com/tdbs/tdb?order=88A+60957, 3 pages, Mar. 18, 2009.

Prater et al., "Thermal and Heat-Flow Aspects of Actuators for Hard Disk Drives", InterSociety Conference on Thermal Phenomena, pp. 261-268, 1994.

Terwiesch et al., "An Exploratory Study of International Product Transfer and Production Ramp-Up in the Data Storage Industry", The Information Storage Industry Center, University of California, www-irps.ucsd.edu/~sloan/, pp. 1-31, 1999.

Tzeng, "Dynamic Torque Characteriestics of Disk-Drive Spindle Bearings", ISPS-vol. 1, Advances in Information Storage and Processing Systems, pp. 57-63, ASME 1995.

Tzeng, "Measurements of Transient Thermal Strains in a Disk-Drive Actuator", InterSociety conference on Thermal Phenomena, pp. 269-274, 1994.

Wilson-7000 disk Drive Analyzer Product Literature, date accessed Jan. 28, 2009, 2 pages.

Notification of Transmittal of the International Search Report and the Written Opinion of the International Searching Authority, or the Declaration, for International Application No. PCT/US2009/039926, Sep. 1, 2009, 13 pages.
Abramovitch, "Rejecting Rotational Disturbances on Small Disk Drives Using Rotational Accelerometers", Proceedings of the 1996 IFAC World Congress in San Francisco, CA, Jul. 1996 http://dabramovitch.com/pubs/amrfac_matj.pdf.
Ali et al., "Modeling and Simulation of Hard Disk Drive Final Assembly Using a HDD Template" Proceedings of the 2007 Winter Simulation Conference, IEEE pp. 1641-1650, 2007 http://portal.acm.org/citation.cfm?id=1351837.
Anderson et al., "Clinical chemistry: concepts and applications", The McGraw-Hill Companies, Inc., pp. 131-132, 2003.
Curtis et al., "InPhase Professional Archive Drive Architecture" Dec. 17, 2007 http://www.science.edu/TechoftheYear/Nominees/InPhase/Holographic%20Storage.pdf.
Findeis et al., "Vibration Isolation Techniques Sutiable for Portable Electronic Speckle Pattern Interferometry", Proc. SPIE vol. 4704, pp. 159-167, 2002 http://www.ndt.uct.ac.za/Papers/spiendt2002.pdf.
Frankovich, "The Basics of Vibration Isolation Using Elastomeric Materials", EARSC 2005 http://www.isoloss.com/pdfs/engineering/BasicsofVibrationIsolation.pdf.
Grochowski et al., "Future Trends in Hard Disk Drives" IEEE Transactions on Magnetics, vol. 32, No. 3, pp. 1850-1854, May 1996 http://svn.tribler.org/abc/branches/leo/dataset/preferences/johan/johan-68.pdf.
Gurumurthi et al., "Disk Drive Roadmap from the Thermal Perspective: A Case for Dynamic Thermal Management", International Symposium on Computer Architecture Proceedings of the $32^{nd}$ Annual International Symposium on Computer Architecture, pp. 38-49, 2005 http://portal.acm.org/citation.cfm?id=1069807.1069975.
Johnson et al., "Performance Measurements of Tertiary Storage Devices", Proceedings of the $24^{th}$ VLDB Conference, New York, pp. 50-61, 1998.
Nagarajan, "Survey of Cleaning and cleanliness Measurement in Disk Drive Manufacture", North Carolina Department of Environment and Natural Resources, Feb. 1997.
Yee Leong Low et al., "Thermal network model for temperature prediction in hard disk drive" Journal Microsystem Technologies, vol. 15, No. 10-11, pp. 1653-1656, Oct. 2009 http://www.springerlink.com/content/20668jn67pk426r5/.
Annex to Form PCT/ASA/206 Communication Relating to the Results of the Partial International Search, for International Application No. PCT/US2008/086814, dated Apr. 3, 2009, 5 pages.
Annex to Form PCT/ASA/206 Communication Relating to the Results of the Partial International Search, for International Application No. PCT/US2008/086809, dated Apr. 3, 2009, 1 page.
Notification of Transmittal of the International Search Report and the Written Opinion of the International Searching Authority, or the Declaration, for International Application No. PCT/US2008/086814, Sep. 18, 2009, 17 pages.
Notification of Transmittal of the International Search Report and the Written Opinion of the International Searching Authority, or the Declaration, for International Application No. PCT/US2009/039888, Sep. 28, 2009, 13 pages.
Notification of Transmittal of the International Search Report and the Written Opinion of the International Searching Authority, or the Declaration, for International Application No. PCT/US2009/039921, Sep. 25, 2009, 14 pages.
Notification of Transmittal of the International Search Report and the Written Opinion of the International Searching Authority, or the Declaration, for International Application No. PCT/US2009/040058, Sep. 29, 2009, 13 pages.
Notification of Transmittal of the International Search Report and the Written Opinion of the International Searching Authority, or the Declaration, for International Application No. PCT/US2009/040829, Oct. 28, 2009, 13 pages.
Notification of Transmittal of the International Search Report and the Written Opinion of the International Searching Authority, or the Declaration, for International Application No. PCT/US2009/039590, Oct. 30, 2009, 10 pages.
Notification of Transmittal of the International Search Report and the Written Opinion of the International Searching Authority, or the Declaration, for International Application No. PCT/US2009/040835, Oct. 30, 2009, 13 pages.
Notification of Transmittal of the International Search Report and the Written Opinion of the International Searching Authority, or the Declaration, for International Application No. PCT/US2009/040757, Nov. 23, 2009, 12 pages.
Notification of Transmittal of the International Search Report and the Written Opinion of the International Searching Authority, or the Declaration, for International Application No. PCT/US2009/039898, Nov. 24, 2009, 12 pages.
Notification of Transmittal of the International Search Report and the Written Opinion of the International Searching Authority, or the Declaration, for International Application No. PCT/US2009/040795, Nov. 26, 2009, 13 pages.
Notification of Transmittal of the International Search Report and the Written Opinion of the International Searching Authority, or the Declaration, for International Application No. PCT/US2009/045583, Nov. 27, 2009, 13 pages.
Notification of Transmittal of the International Search Report and the Written Opinion of the International Searching Authority, or the Declaration, for International Application No. PCT/US2009/040888, Dec. 29, 2009, 14 pages.
Notification of Transmittal of the International Search Report and the Written Opinion of the International Searching Authority, or the Declaration, for International Application No. PCT/US2009/040894, Dec. 22, 2009, 12 pages.
Notification of Transmittal of the International Search Report and the Written Opinion of the International Searching Authority, or the Declaration, for International Application No. PCT/US2009/039934, Dec. 23, 2009, 12 pages.
Notification of Transmittal of the International Search Report and the Written Opinion of the International Searching Authority, or the Declaration, for International Application No. PCT/US2009/040965, Dec. 23, 2009, 12 pages.
Notification of Transmittal of the International Search Report and the Written Opinion of the International Searching Authority, or the Declaration, for International Application No. PCT/US2009/040973, Jan. 11, 2010, 13 pages.
Cardinal Intellectual Property's search report including the results of a search for the features of the claims included in the U.S. patent application entitled "Transferring Storage Devices Within Storage Device Testing Systems", inventors: John P. Toscano et al., and having assigned U.S. Appl. No. 12/727,201. The Foregoing U.S. patent application is a continuation of U.S. Appl. No. 12/424,980, (US PG Pub. 2010/0168906).
Cardinal Intellectual Property's search report including the results of a search for the features of the claims included in the U.S. patent application entitled "Processing Storage Devices", inventors: Richard W. Slocum III., and having assigned U.S. Appl. No. 12/727,619. The foregoing U.S. patent application is a continuation of U.S. Appl. No. 12/474,388, US PG. Pub. 2010/0174404, US 7,908,029.
Cardinal Intellectual Property's search report including the results of a search for the features of the claims included in the U.S. patent application entitled "Bulk Feeding Disk Drives to Disk Drive Testing Systems", inventors: Noble et al., and having assigned U.S. Appl. No. 12/726,856. The foregoing U.S. patent application is a continuation of U.S. Appl. No. 12/104,869, US PG. Pub 2010/0172722.
Cardinal Intellectual Property's search report including the results of a search for the features of the claims included in the U.S. patent application entitled "Dependent Temperature Control within Disk Drive Testing Systems", inventors: Merrow et al., and having assigned U.S. Appl. No. 12/727,207. The foregoing U.S. patent application is a continuation of U.S. Appl. No. 12/105,069, US PG. Pub 2010/0165498.
Cardinal Intellectual Property's search report including the results of a search for the features of the claims included in the U.S. patent application entitled "Test Slot Cooling System for a Storage Device Testing System", inventors: Merrow et al., and having assigned U.S. Appl. No. 12/045,783. The foregoing U.S. patent application is a continuation of U.S. Appl. No. 12/503,567, US PG. Pub 2011/0157825.

Cardinal Intellectual Property's search report including the results of a search for the features of the claims included in the U.S. patent application entitled "Storage Device Testing System Cooling", inventors: Brian S. Merrow and having assigned U.S. Appl. No. 12/815,140. The foregoing U.S. patent application is a continuation of U.S. Appl. No. 12/698,575, US PG. Pub. 2011/0064546.

Cardinal Intellectual Property's search report including the results of a search for the features of the claims included in the U.S. patent application entitled "Conductive Heating", inventors: Brian S. Merrow et al., and having assigned U.S. Appl. No. 12/836,915. The foregoing U.S. patent application is a continuation of U.S. Appl. No. 12/503,593, US PG. Pub 2011/0012632.

Cardinal Intellectual Property's search report including the results of a search for the features of the claims included in the U.S. patent application entitled "Conductive Temperature Sensing", inventors: Brian S. Merrow et al., and having assigned U.S. Appl. No. 12/760,305. The foregoing U.S. patent application is a continuation of U.S. Appl. No. 12/503,687, US PG. Pub. 2011/0013666; US 7,949,529.

Cardinal Intellectual Property's search report including the results of a search for the features of the claims included in the U.S. patent application entitled "Solid State Temperature Control of Hard Drive Tester", inventors: Brian S. Merrow and having assigned U.S. Appl. No. 12/856,056. The foregoing U.S. patent application is a continuation of U.S. Appl. No. 12/105,103, US PG. Pub. 2010/0302678.

Cardinal Intellectual Property's search report including the results of a search for the features of the claims included in the U.S. patent application entitled "Single Test Slot for Dynamic Isolation of Hard Drive", inventors: Brian S. Merrow and having assigned U.S. Appl. No. 12/767,142. The foregoing U.S. patent application is a continuation of U.S. Appl. No. 12/105,105, US PG. Pub. 2010/1093661; US 7,911,778.

Cardinal Intellectual Property's search report including the results of a search for the features of the claims included in the U.S. patent application entitled "Hard Drive Transport Sled", inventors: Brian S. Merrow et al., and having assigned U.S. Appl. No. 12/834,459. The foregoing U.S. patent application is a continuation of U.S. Appl. No. 12/959,133, US PG. Pub. 2010/0265609; 2010/0195236; 2010/0265610.

Cardinal Intellectual Property's search report including the results of a search for the features of the claims included in the U.S. patent application entitled "Chilled Water Temp Control of Disk Drive Tester", inventors: Brian S. Merrow and having assigned U.S. Appl. No. 12/937,918. The foregoing U.S. patent application is a continuation of U.S. Appl. No. 12/105,061, US PG. Pub. 2011/0083825.

Cardinal Intellectual Property's search report including the results of a search for the features of the claims included in the U.S. patent application entitled "Transferring Disk Drives Within Disk Drive Testing Systems", inventors: Polyakov et al, and having assigned U.S. Appl. No. 12/424,980. The foregoing U.S. patent application is a continuation of U.S. Appl. No. 12/104,536, US PG. Pub. 2009/0265032.

Cardinal Intellectual Property's search report including the results of a search for the features of the claims included in the U.S. patent application entitled "Vibration Isolation Within Disk Drive Testing Systems," inventors: Brian S. Merrow and having assigned U.S. Appl. No. 12/767,142. The foregoing U.S. patent application is a continuation of U.S. Appl. No. 12/105,105. Revised as of Mar. 30, 2010.

Cardinal Intellectual Property's search report including the results of a search for the features of the claims included in the U.S. patent application entitled "Disk Drive Clamping Transport and Testing," inventors: Brian S. Merrow et al., and having assigned U.S. Appl. No. 12/767,113. The foregoing U.S. patent application is a continuation of U.S. Appl. No. 11/959,133.

Cardinal Intellectual Property's search report including the results of a search for the features of the claims included in the U.S. patent application entitled "Disk Drive Clamping Transport and Testing," inventors: Brian S. Merrow et al., and having assigned U.S. Appl. No. 12/766,680. The foregoing U.S. patent application is a continuation of U.S. Appl. No. 11/959,133. Revised as of Apr. 1, 2010.

Exhibit 1 in *Xyratex Technology, LTD* v. *Teradyne, Inc.*; Newspaper picture that displays the CSO tester; 1990.

Exhibit 2 in *Xyratex Technology, LTD* v. *Teradyne, Inc.*; Photos of the CSO tester obtained from Hitachi; 1990.

Exhibit 1326 in *Xyratex Technology, LTD* v. *Teradyne, Inc.*; Image of the back of Exhibit 1 and Exhibit 2 photos, which display the photos' dates; 1990.

Exhibit 1314 in *Xyratex Technology, LTD*. V. *Teradyne, Inc.*; Case, "Last products of Disk-File Development at Hursley and Millbrook," IBM, Oct. 12, 1990.

Exhibit 1315 in *Xyratex Technology, LTD*. V. *Teradyne, Inc.*; Case, "History of Disk-File Development at Hursley and Millbrook," IBM, Oct. 17, 1990.

*Xyratex Technology, LTD*. V. *Teradyne, Inc.*, Teradyne, Inc's Prior Art Notice Pursuant to 35 U.S.C. Section 282. Case No. CV 08-04545 SJO (PLAx), Oct. 16, 2009.

*Xyratex Technology, LTD*. V. *Teradyne, Inc.*, Amended Joint Trial Exhibit List of Xyratex and Teradyne. Case No. CV 08-04545 SJO (PLAx), Nov. 12, 2009.

Notification of Transmittal of the International Search Report and the Written Opinion of the International Searching Authority, or the Declaration, for International Application No. PCT/GB2005/003490, Jan. 26, 2006, 10 pages.

Invitation to Pay Additional Fees and, Where Applicable, Protest Fee, PCT/US2008/086814, pp. 1-5, dated Mar. 4, 2009.

Invitation to Pay Additional Fees and, Where Applicable, Protest Fee, PCT/US2008/086809, pp. 1-6, dated Mar. 4, 2009.

Bakken et al., "Low Cost, Rack Mounted, Direct Access Disk Storage Device", www.ip.com, 4 pages, Mar. 3, 2005.

Biber et al., "Disk Drive Drawer Thermal Management", Advances in Electronic Packaging vol. 1:43-46, 1995.

Chung et al., "Vibration Absorber for Reduction of the In-plane Vibration in an Optical Disk Drive", IEEE Transactions on Consumer Electronics, Vo. 48, May 2004.

FlexStar Technology, 30E/Cascade Users Manual, Doc #98-36387-00 Rev. 1.8, pp. 1-33.

FlexStar Technology, "A World of Storage Testing Solutions," http://www.flexstar.com, 1 page (1999).

FlexStar Technology, "Environment Chamber Products," http://www.flexstar.com, 1 page (1999).

FlexStar Technology, "FlexStar's Family of Products," http://www.flexstar.com, 1 page (1999).

Gurumurthi, "The Need for temperature-Aware Storage Systems", The Tenth Intersociety conference on Thermal and Thermomechanical Phenomena in Electronics, ITHERM pp. 387-394, 2006.

Gurumurthi et al., "Thermal Issues in Disk Drive Design: Challenges and Possible Solutions", ACM Transactions on Storage 2:41-73, Feb. 2006.

Henderson, "HAD High Aerial Densities Require Solid Test Fixtures", Flexstar Technology.

Lindner, "Disk drive mounting", IBM Technical Disclosure Brochure, vol. 16, No. 3, pp. 903-904, Aug. 1973.

Morgenstern, Micropolis Drives Target High-end Apps; Technology Provides Higher Uninterrupted Data Transfer. (Applications; Microdisk AV LS 3020 and 1050AV and 1760AV LT Stackable Hard Drive Systems) (Product Announcement) MacWeek, vol. 8, No. 6, p. 8; Feb. 7, 1994.

Morris, "Zero Cost Power and Cooling Monitor System", www.delphion.com/tdbs/tdb?order=94A+61950, 3 pages, Jan. 15, 2008.

Notification of Transmittal of The International Search Report and the Written Opinion of the International Searching Authority, or the Declaration, PCT/US2008/086181, 15 pages, Mar. 16, 2009.

Park, "Vibration and Noise Reduction of an Optical Disk Drive by Using a Vibration Absorber Methods and Apparatus for Securing Disk Drives in a Disk", IEEE Transactions on Consumer Electronics, vol. 48, Nov. 2002.

Ruwart et al., "Performance Impact of External Vibration on Consumer-grade and enterprise-class Disk Drives", Proceedings of the $22^{nd}$ IEEE/$13^{th}$ Goddard Conference on Mass Storage Systems and Technologies, 2005.

Seagate Product Marketing, "Seagate's Advanced Multidrive System (SAMS) Rotational Vibration Feature", Publication TP-229D, Feb. 2000.

Schroeder et al., "Disk Failures in the Real World: What does an MTTP of 1,000,000 hours mean to you?", In FAST'07: 5$^{th}$ USENIX Conference on File and Storage Technologies, San Jose, CA, Feb. 14-16, 2007.

Schulze et al., "How Reliable is a Raid?," COMPCON Spring apos; 89. Thirty-Fouth IEEE Computer Society International Conference: Intellectual Leverage, Digest of papers; pp. 118-123, Feb. 27-Mar. 3, 1989.

Winchester, "Automation Specialists Use Machine Vision as a System Development Tool", IEE Computing & Control Engineering, Jun./Jul. 2003.

Xyratex website "Storage Infrastructure" www.xyratex.com/Products/storage-infrastructure/default.aspx 1995-2008.

Xyratex website "Production Test Systems" www.xyratex.com/Products/production-test-systems/default.aspx 1995-2008.

Xyratex website "Single cell—Production Test Systems" www.xyratex.com/products/production-test-systems/single-cell.aspx 1995-2008.

Xyratex website "Continuous Innovation—Production Test Systems" www.xyratex.com/products/production-test-systems/continuous-innovation.aspx 1995-2008.

Xyratex website "Key Advantages—Production Test Systems" www.xyratex.com/products/production-test-systems/advantages.aspx 1995-2008.

Xyratex website "Testing Drives Colder—Production Test Systems" www.xyratex.com/products/productino-test-systems/colder.aspx 1995-2008.

"Xyratex to Debut its New Automated Test Solution for 2.5-Inch Disk Drives at DISKCON USA 2004" 2004 PR Newswire Europe www.prnewswire.co.uk/cgi/news/release?id=130103.

"Automated Production Test Solutions", Xyratex Product Test brochure, 2006.

Xyratex "Process Challenges in the Hard Drive Industry" slide presentation, 2006 Asian Diskcon.

Suwa et al., "Evaluation System for Residual Vibration from HDD Mounting Mechanism" IEEE Transactions on Magnetics, vol. 35, No. 2, pp. 868-873, Mar. 1999.

Suwa et al., "Rotational Vibration Suppressor" IBM Technical Disclosure Bulletin Oct. 1991.

Fish & Richardson P.C., Request for Reconsideration in response to the Decision on Petition to Make Special for New Application Under 37 C.F.R. 1.102 in U.S. Appl. No. 12/726,856, Request filed Jun. 11, 2010, 4 pages.

Fish & Richardson P.C., Accelerated Examination Support Document and Accompanying Table 1 in U.S. Appl. No. 12/726,856, filed Jun. 11, 2010, 42 pages.

Notification of Transmittal of the International Search Report and the Written Opinion of the International Searching Authority, or the Declaration, for International Application No. PCT/US2009/039591, Aug. 31, 2009, 10 pages.

International Search Report and Written Opinion of the International Searching Authority in connection with International Application No. PCT/US2008/086814; dated Sep. 18, 2009. 50 Pages.

International Search Report and Written Opinion of International Searching Authority in connection with International Application No. PCT/US2008/086809; dated Sep. 17, 2009. 52 Pages.

\* cited by examiner

BULK FEEDING DISK DRIVES TO DISK DRIVE TESTING SYSTEMS

TECHNICAL FIELD

This disclosure relates to bulk feeding disk drives to disk drive testing systems and transfer stations for disk drive testing systems.

BACKGROUND

Disk drive manufacturers typically test manufactured disk drives for compliance with a collection of requirements. Test equipment and techniques exist for testing large numbers of disk drives serially or in parallel. Manufacturers tend to test large numbers of disk drives simultaneously in batches. Disk drive testing systems typically include one or more racks having multiple test slots that receive disk drives for testing.

The testing environment immediately around the disk drive is closely regulated. Minimum temperature fluctuations in the testing environment are critical for accurate test conditions and for safety of the disk drives. The latest generations of disk drives, which have higher capacities, faster rotational speeds and smaller head clearance, are more sensitive to vibration. Excess vibration can affect the reliability of test results and the integrity of electrical connections. Under test conditions, the drives themselves can propagate vibrations through supporting structures or fixtures to adjacent units. This vibration "cross-talking," together with external sources of vibration, contributes to bump errors, head slap and non-repetitive run-out (NRRO), which may result in lower test yields and increased manufacturing costs.

Current disk drive testing systems use an operator, a robotic arm, or a conveyer belt to individually feed disk drives to a transfer location for loading into the testing system for testing. A robotic arm of the testing system individually retrieves the disk drives from the transfer location and loads them in test slots for testing.

SUMMARY

In one aspect, a method of supplying disk drives to a disk drive testing system includes placing a disk drive tote, carrying multiple disk drives, in a presentation position accessible to an automated transporter (e.g. robotic arm, gantry system, or multi-axis linear actuator) of the disk drive testing system. The method includes actuating the robotic arm to retrieve one of the disk drives from the disk drive tote, and actuating the automated transporter to deliver the retrieved disk drive to a test slot of the disk drive testing system and insert the disk drive in the test slot.

Implementations of this aspect of the disclosure may include one or more of the following features. In some implementations, the method includes actuating the automated transporter to retrieve a disk drive transporter, actuating the automated transporter to retrieve one of the disk drives from the disk drive tote by using the disk drive transporter to carry the disk drive, and actuating the automated transporter to deliver the disk drive transporter carrying disk drive to the test slot. The automated transporter can retrieve the disk drive from the disk drive tote with the disk drive transporter by positioning the disk drive transporter below the disk drive, lifting the disk drive off a disk drive support of the disk drive tote, and carrying the disk drive in the disk drive transporter away from the disk drive tote. When the disk drive transporter, carrying the disk drive, is inserted into the test slot, the disk drive engages with a connector of the disk drive testing system, and the disk drive transporter provides closure of the test slot.

In some implementations, placing the disk drive tote in the presentation position includes placing the disk drive tote in a loading position on a transfer station, and actuating the transfer station to move the disk drive tote from the loading position to the presentation position for servicing by the automated transporter. The transfer station includes a transfer station housing and multiple tote presentation support systems disposed on the transfer station housing. Each tote presentation support system is configured to receive and support a disk drive tote in the presentation position for servicing by the disk drive testing system (e.g. by the robotic arm). A tote mover, disposed on the transfer station housing, moves a loaded disk drive tote between the loading position and the presentation position at one of the tote presentation support systems. In some examples, the method includes reading a tote marking on the disk drive tote and actuating the transfer station (e.g. actuating the tote mover) to move the disk drive tote from the loading position to the presentation position based on the tote marking. The tote marking can be a barcode, a color marking, or any suitable general or unique identifier. The method may include assigning the disk drive tote a function property (e.g. "good output" disk drive tote, "bad output" disk drive tote, or "input" disk drive tote) that affects the usage of the disk drive tote in the disk drive testing system. The function property is dynamically re-assignable during usage of the disk drive tote in the disk drive testing system.

In some implementations, the disk drive tote placed in the presentation position is held in the presentation position by a transfer station configured to hold multiple disk drive totes in the presentation position for servicing by the automated transporter. The disk drive tote is supported in the presentation position by a tote presentation support system. In some examples, the tote presentation support system includes first and second opposing pairs of tote support arms configured to be received by respective arm grooves defined by a tote body of the disk drive tote.

In another aspect, a method of supplying disk drives to a disk drive testing system includes loading multiple disk drives into a disk drive tote, placing the disk drive tote in a loading position on a transfer station, and actuating a tote mover of the transfer station to move the disk drive tote from the loading position to a presentation position for servicing by the disk drive testing system.

Implementations of this aspect of the disclosure may include one or more of the following features. In some implementations, the disk drive tote is supported in the presentation position by one of multiple tote presentation support systems disposed on a transfer station housing of the transfer station. The tote presentation support systems can be arranged vertically with respect to each other. In some examples, the tote presentation support system includes first and second opposing pairs of tote support arms configured to be received by respective arm grooves defined by a tote body of the disk drive tote. The arm grooves can be releasably locked into a predetermined position on the tote support arms, thereby holding the respective disk drive tote in its presentation position.

In some implementations, the method includes loading multiple disk drive totes, each housing disk drives, onto the transfer station by sequentially placing each disk drive tote in the loading position on the transfer station and actuating the tote mover to move each disk drive tote to the presentation position at one of the multiple tote presentation support systems for servicing by the disk drive testing system. In some examples, the method includes reading a tote marking on the disk drive tote and actuating the transfer station (e.g. actuating the tote mover) to move the disk drive tote from the loading position to the presentation position at one of the tote presentation support systems based on the tote marking. The tote marking can be a barcode, a color marking, or any suitable general or unique identifier. The method may include assigning the disk drive tote a function property that affects the usage of the disk drive tote in the disk drive testing system. The function property is dynamically re-assignable during usage of the disk drive tote in the disk drive testing system.

In some examples, the transfer station includes a door pivotally attached to its transfer station housing. The door is operable to receive and support a disk drive tote and provides closure of a tote supply opening defined by the transfer station housing. The method may include opening the door to an open position, placing the disk drive tote in a preloading position on the door, and closing the door by rotating the door to a closed position, thereby placing the disk drive tote in the loading position.

In some implementations, the tote mover includes a multi-axis actuator assembly configured to move the disk drive tote between the loading position and the presentation position. The multi-axis actuator assembly may include a vertical actuator, a horizontal actuator, and a pitch actuator. Preferably, the multi-axis actuator assembly includes first, second, and third linear actuators. The first linear actuator is disposed on a side wall of the transfer station housing. A lift carriage is coupled to the first linear actuator. The second linear actuator is disposed on the lift carriage and is pivotally coupled to a tote loading support, which is configured to support at least one disk drive tote. The tote loading support is operable to rotate between the loading and presentation positions. The third linear actuator is pivotally coupled to both the second linear actuator and the tote loading support. The third linear actuator is operable to rotate the tote loading support. The disk drive tote includes a tote body that defines multiple disk drive receptacles configured to each house a disk drive.

In yet another aspect, a transfer station for a disk drive testing system includes a transfer station housing and multiple tote presentation support systems disposed on the transfer station housing. Each tote presentation support system is configured to receive and support a disk drive tote in a presentation position for servicing by the disk drive testing system. A tote mover is disposed on the transfer station housing and is configured to move a disk drive tote between a loading position and the presentation position at one of the tote presentation support systems. The tote mover, in some examples, includes a multi-axis actuator assembly having a vertical actuator, a horizontal actuator, and a pitch actuator.

Implementations of this aspect of the disclosure may include one or more of the following features. In some implementations, the transfer station includes a door pivotally attached to the transfer station housing and configured to provide closure of a tote supply opening defined by the transfer station housing. The door pivots between an open position, for receiving and supporting a disk drive tote, and a closed position, for placing the disk drive tote in the loading position. In some examples, the tote presentation support system includes first and second opposing pairs of tote support arms configured to be received by respective arm grooves defined by a tote body of a disk drive tote.

In another aspect, a transfer station for a disk drive testing system includes a transfer station housing and multiple tote presentation support systems disposed on the transfer station housing. Each tote presentation support system is configured to receive and support a disk drive tote in a presentation position for servicing by the disk drive testing system. The transfer station includes a tote mover disposed on the transfer station housing and a tote loading support pivotally coupled to the tote mover. The tote loading support pivots and moves between first and second positions, and is configured to receive and support a disk drive tote. The tote mover is configured to move the tote loading support between the first position, for supporting a disk drive tote in a loading position, and the second position, for supporting a disk drive tote in the presentation position at one of the tote presentation support systems.

Implementations of this aspect of the disclosure may include one or more of the following features. In some implementations, the tote mover includes a multi-axis actuator assembly, which preferably includes a vertical actuator, a horizontal actuator, and a pitch actuator. In some examples, the multi-axis actuator assembly includes first, second, and third linear actuators. The first linear actuator is disposed on a side wall of the transfer station housing. A lift carriage is coupled to the first linear actuator. The second linear actuator is disposed on the lift carriage and pivotally coupled to the tote loading support, which pivots between the first and second positions. The third linear actuator is pivotally coupled to both the second linear actuator and the tote loading support. The third linear actuator is operable to rotate the tote loading support. In some examples, the first position of the tote loading support is substantially horizontal and the second position of the tote loading support is substantially vertical.

The transfer station may include a staging platform disposed on the transfer station housing and configured to receive a disk drive tote transferred from the tote loading support. The staging platform is disposed on an opposite side of the transfer station housing of at least one of the tote presentation support systems. The transfer station may include a door pivotally attached to the transfer station housing and configured to provide a closure over the staging platform while in a closed position.

In some examples, the transfer station includes a door pivotally attached to the transfer station housing and configured to provide closure of a tote supply opening defined by the transfer station housing. The door is operable to pivot between an open position, for receiving and supporting a disk drive tote, and a closed position, for placing the disk drive tote in the loading position.

The tote presentation support systems can be disposed on the same side of the transfer station housing and arranged vertically with respect to each other. Each tote presentation support systems has a different elevation with respect to the others. The tote presentation support system, in some examples, includes first and second opposing pairs of tote support arms configured to be received by respective arm grooves defined by a tote body of a disk drive tote. The disk drive tote includes a tote body which defines multiple disk drive receptacles configured to each house a disk drive.

In another aspect, a disk drive testing system includes an automated transporter and multiple racks arranged around the automated transporter for access by the automated transporter. Each rack houses multiple test slots, which are each configured to receive a disk drive for testing. The disk drive testing system includes a transfer station arranged for access by the automated transporter. The transfer station includes a transfer station housing and multiple tote presentation support systems disposed on the transfer station housing. Each tote presentation support system is configured to receive and support a disk drive tote in a presentation position for servicing by the disk drive testing system. A tote mover is disposed on the transfer station housing and is configured to move a disk drive tote between a loading position and the presentation position at one of the tote presentation support systems. The tote mover, in some examples, includes a multi-axis actuator assembly having a vertical actuator, a horizontal actuator, and a pitch actuator. The tote presentation support system, in some examples, includes first and second opposing pairs of tote support arms configured to be received by respective arm grooves defined by a tote body of a disk drive tote. In some examples, the tote mover includes first, second, and third linear actuators. The first linear actuator is disposed on a side wall of the transfer station housing. A lift carriage is coupled to the first linear actuator. The second linear actuator is disposed on the lift carriage and pivotally coupled to the tote loading support, which pivots between the first and second positions. The third linear actuator is pivotally coupled to both the second linear actuator and the tote loading support. The third linear actuator is operable to rotate the tote loading support. In some examples, the transfer station includes a marking reader configured to read a tote marking on a received disk drive tote, the tote mover being configured to move the received disk drive tote between the loading position and the presentation position at one of the tote presentation support systems based on the marking read by the marking reader.

The details of one or more implementations of the disclosure are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Bulk feeding of disk drives in a disk drive testing system is advantageous over manual individual feeding of disk drives by providing increased through-put and efficiency of the disk drive testing system, inter alia. As will be discussed in detail, presenting multiple disk drive totes (also referred to as totes), which hold multiple disk drives, to a disk drive testing system allows continual disk drive testing, disk sorting amongst multiple disk drive totes, minimal user intervention, and increased efficiency over current systems, inter alia. Bulk feeding of disk drives in disk drive totes provides the advantage of shop floor flexibility (e.g. by providing the ability to easily redirect a disk drive tote or a cart or trolley carrying disk drive totes versus rerouting fixed conveyors). An operator can present a batch of drives (e.g. via the disk drive tote) to the disk drive testing system and then walk away to service another system. Bulk feeding of disk drives in disk drive totes also allows automatic sorting of tested drives with the disk drive totes, as will be discussed below.

Figure 1:
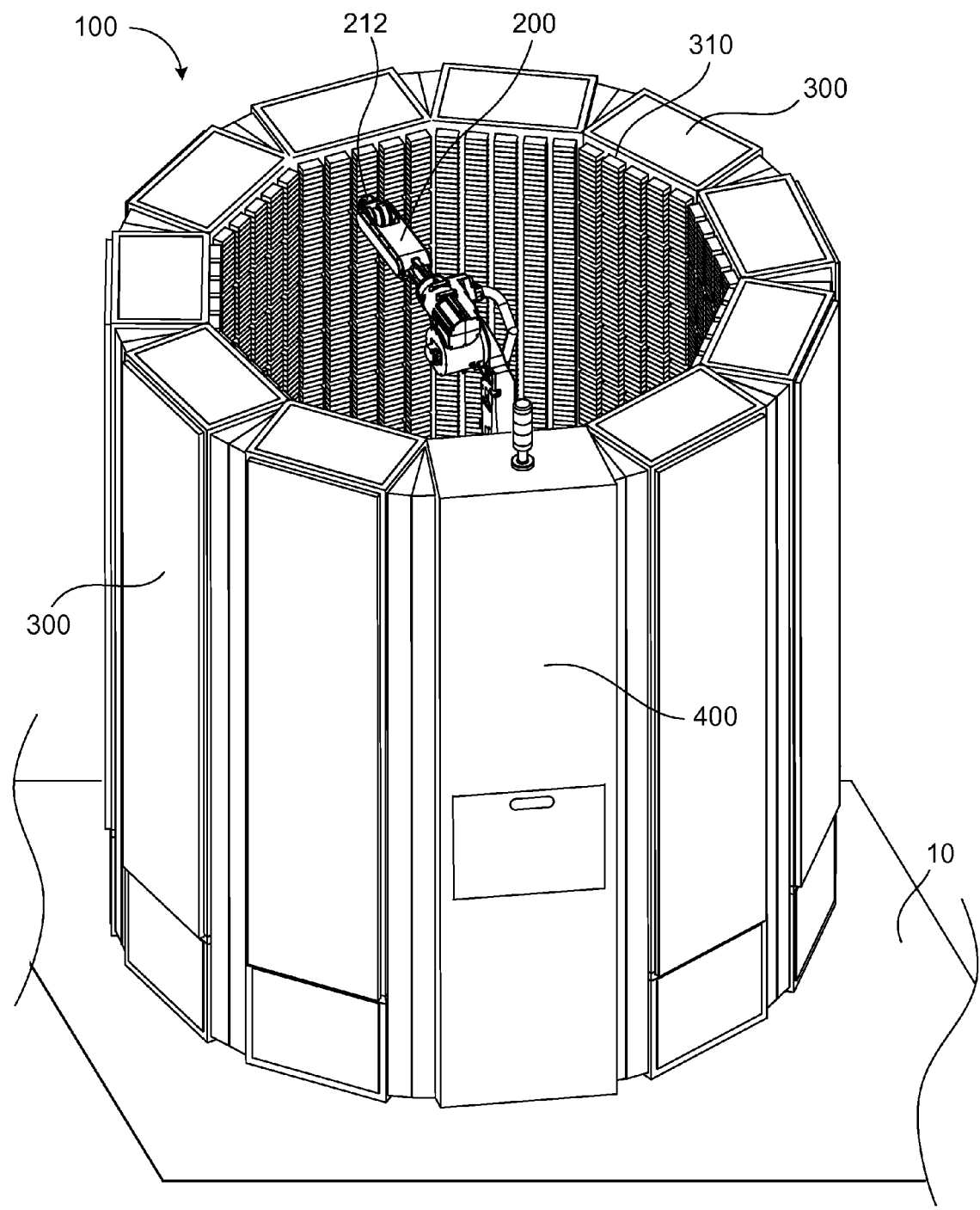
FIG. 1 is a perspective view of a disk drive testing system and a transfer station.
Figure 2:
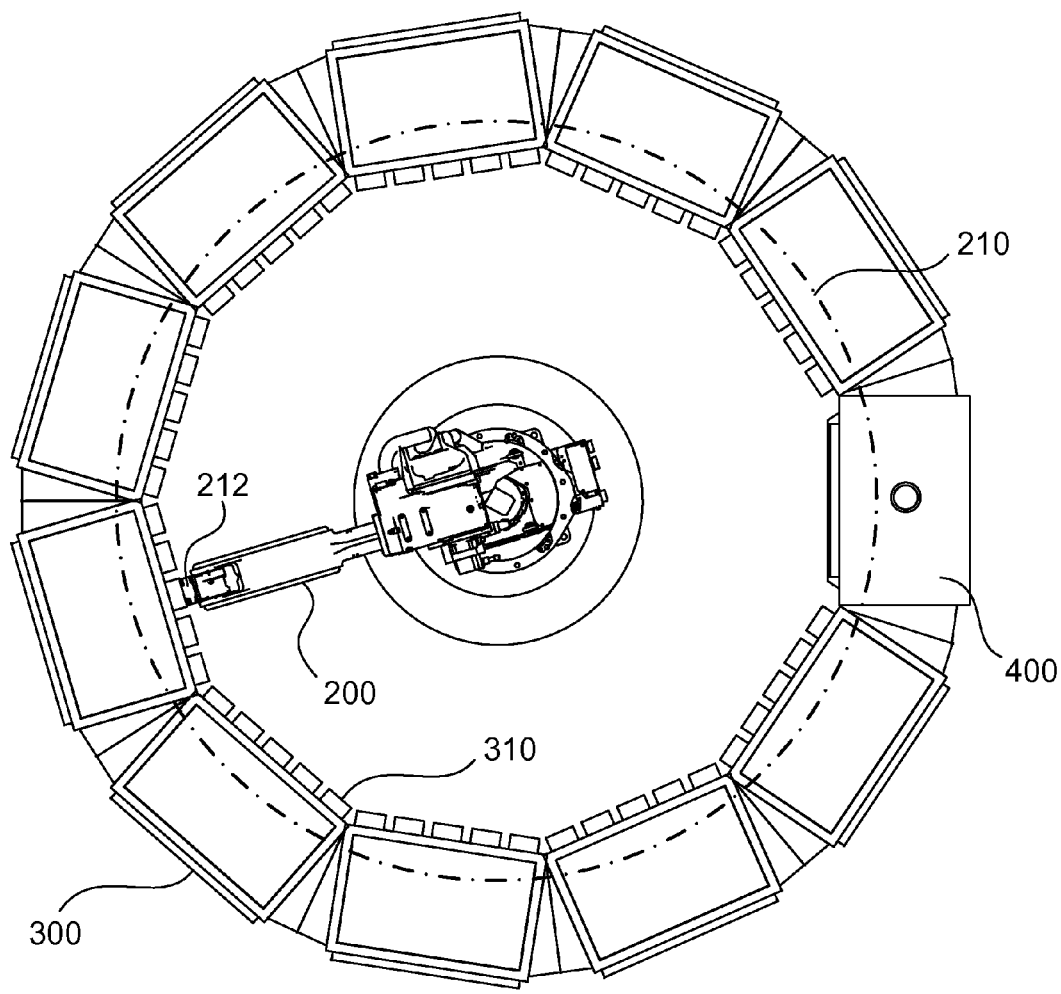
FIG. 2 is a top view of a disk drive testing system and a transfer station.
Figure 3:
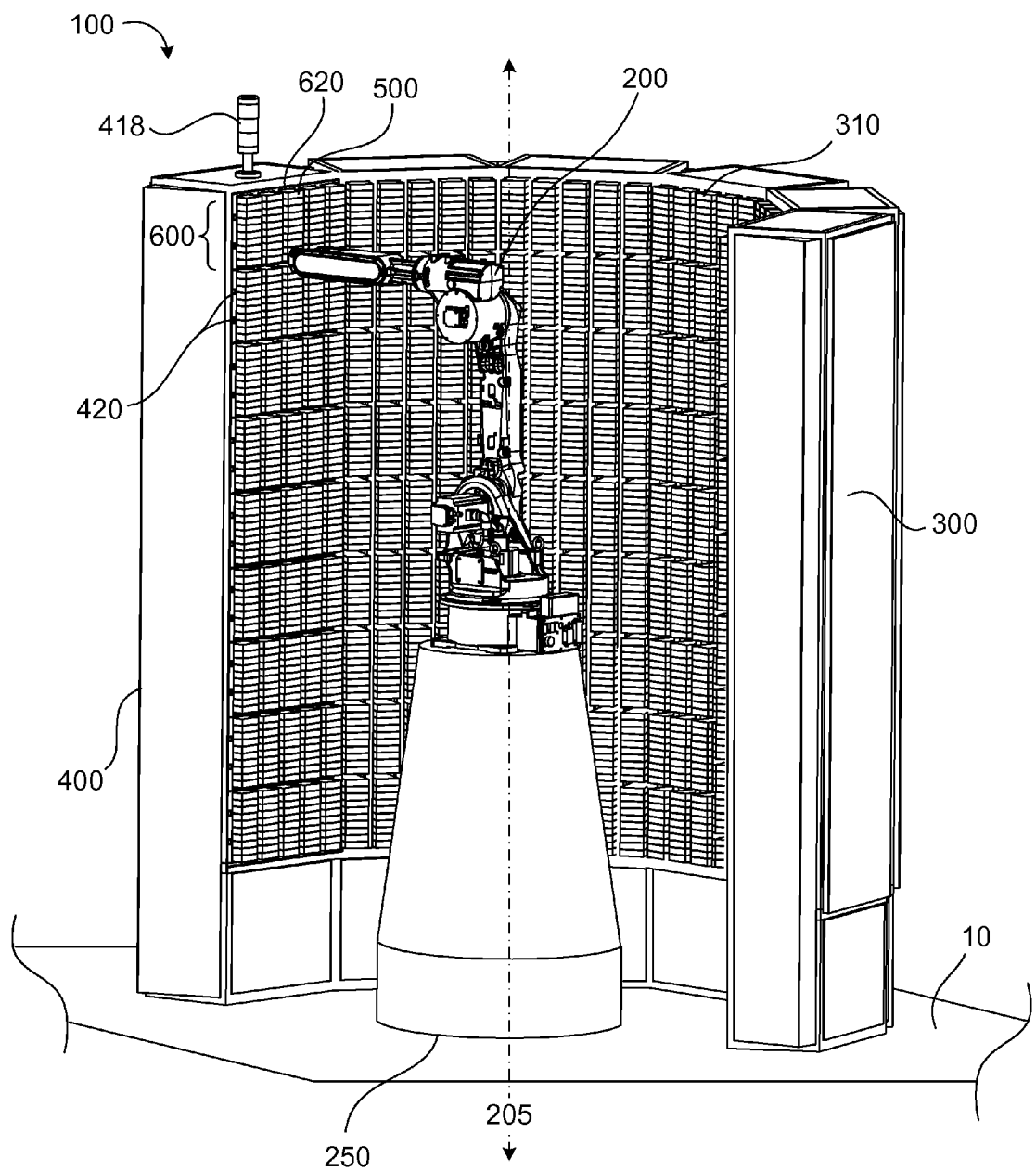
FIG. 3 is a perspective view of a disk drive testing system and a transfer station.

Referring to FIGS. 1-3, in some implementations, a disk drive testing system 100 includes at least one automated transporter 200 (e.g. robotic arm, gantry system, or multi-axis linear actuator) defining a first axis 205 (see FIG. 3) substantially normal to a floor surface 10. In the examples shown, the automated transporter 200 comprises a robotic arm 200 operable to rotate through a predetermined arc about the first axis 205 and to extend radially from the first axis 205. The robotic arm 200 is operable to rotate 360° about the first axis 205 and includes a manipulator 212 disposed at a distal end of the robotic arm 200 to handle a disk drive 500 and/or a disk drive transporter 550 carrying the disk drive 500 (see e.g. FIGS. 5-6). Multiple racks 300 are arranged around the robotic arm 200 for servicing by the robotic arm 200. Each rack 300 houses multiple test slots 310 configured to receive disk drives 500 for testing. The robotic arm 200 defines a substantially cylindrical working envelope volume 210, with the racks 300 being arranged within the working envelope 210 for accessibility of each test slot 310 for servicing by the robotic arm 200. The substantially cylindrical working envelope volume 210 provides a compact footprint and is generally only limited in capacity by height constraints. In some examples, the robotic arm 200 is elevated by and supported on a pedestal or lift 250 on the floor surface 10. The pedestal or lift 250 increases the size of the working envelope volume 210 by allowing the robotic arm 200 to reach not only upwardly, but also downwardly to service test slots 310. The size of the working envelope volume 210 can be further increased by adding a vertical actuator to the pedestal or lift 250.

The automated transporter 200 is configured to independently service each test slot 310 to provide a continuous flow of disk drives 500 through the testing system 100. A continuous flow of individual disk drives 500 through the testing system 100 allows random start and stop times for each disk drive 500, whereas other systems that require batches of disk drives 500 to be run all at once as an entire testing loaded must all have the same start and end times. Therefore, with continuous flow, disk drives 500 of different capacities can be run at the same time and serviced (loaded/unloaded) as needed.

Figure 4:
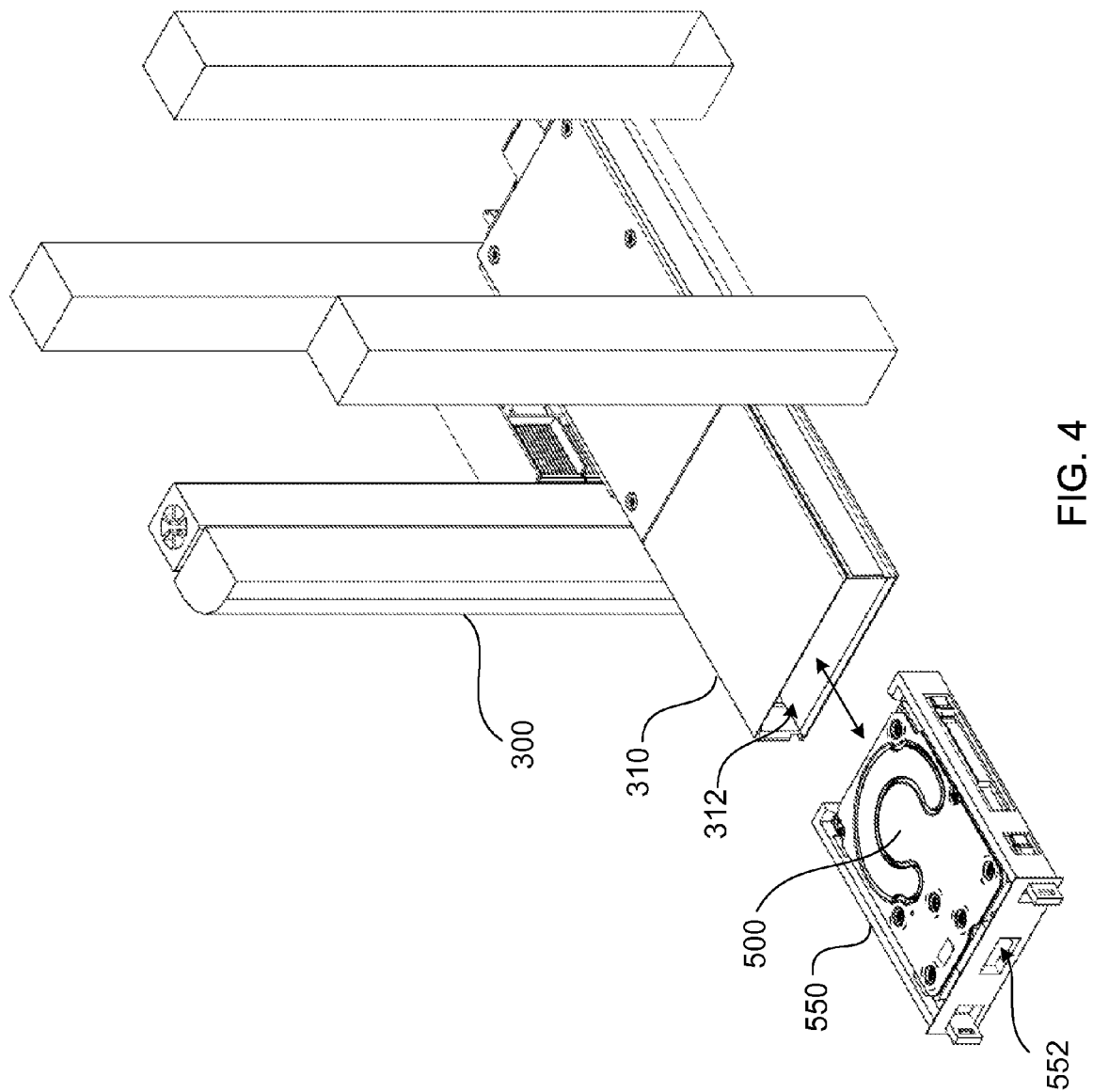
FIG. 4 is a perspective view of a disk drive being inserted into a test slot of a disk drive testing system.

Referring to FIGS. 3-4, the disk drive testing system 100 includes a transfer station 400 configured for bulk feeding of disk drives 500 to the automated transporter 200. The automated transporter 200 independently services each test slot 310 by transferring a disk drive 500 between the transfer station 400 and the test slot 310. The transfer station 400 houses one or more totes 600 carrying multiple disk drives 500 presented for servicing by the automated transporter 200. The transfer station 400 is a service point for delivering and retrieving disk drives 500 to and from the disk drive testing system 100. The totes 600 allow an operator to deliver and retrieve a collection of disk drives 500 to and from the transfer station 400. In the example shown in FIG. 3, each tote 600 is accessible from respective tote presentation support systems 420 in a presentation position and may be designated as a source tote 600 for supplying a collection of disk drives 500 for testing or as a destination tote 600 for receiving tested disk drives 500 (or both). Destination totes 600 may be classified as "passed return totes" or "failed return totes" for receiving respective disk drives 500 that have either passed or failed a functionality test, respectively. Each tote 600 may include a marking 660 (e.g. barcode, color mark, or unique identifier, such as a symbol) (see FIG. 9) that can be used to identify and categorize/classify the tote 600 and its contents. For example, the markings 660 on the totes 600 are barcodes, which has been assigned or associated with certain properties, such as "supply tote", "passed return tote", or "failed return tote". When a tote 600 is loaded with untested disk drives 500, an operator or automated machine can read the barcode 660 with a barcode reader and associate the "supply tote" property with that tote, before it is loaded onto the transfer station 400. Similarly, an empty tote 600 can be associated with either the "passed return tote" or "failed return tote" property before it is loaded onto the transfer station 400. The marking property can be assigned or re-assigned at any time or point within the system.

Dynamic redefinition of the tote marking property provides a significant advantage of this system over manual systems (where the disk drive totes are hung or placed in a particular location) or a carousel system (where each tier of a carousel typically contains one type of tote). Since the transfer station 400 provides a single input/output station for the disk drive testing system 100, the location where the disk drive totes 600 are loaded or unloaded becomes decoupled from the function of the disk drive totes 600. Input disk drive totes 600, good output disk drive totes 600, and bad output disk drive totes 600, are all loaded and unladed from the same place. In the cases where the disk drive totes 600 do not have tote marking 660 with assigned tote marking properties (e.g. functions), the function 600 of the tote can change while the tote 600 is in the transfer station 400 or presented to the disk drive testing system 100. For example, if all of the "good output" disk drive totes 600 are filled by the automated transporter 200, but there are several empty "bad output" disk drive totes 600 waiting idle, one or more of these disk drive totes 600 can be reassigned (via the marking property association) to be a "good output" disk drive totes 600. In another example, "input" disk drive totes 600 can become one or the other type of "output" disk drive totes 600 once they are emptied, thus saving the effort of removing them from the system and re-inserting a different type of disk drive tote 600. This provides advantages for disk drive testing system 100 with its single load/unload transfer station 400, because an operator has no assumptions about the functions of a disk drive tote 600 based on its presentation position. When the transfer station 400 is requested to yield a "bad output" disk drive tote 600, it will produce a "bad output" disk drive tote 600, whether it started that way or not.

In implementations that employ disk drive transporters 550 for manipulating disk drives 500, as shown in FIG. 4, the automated transporter 200 is configured to remove a disk drive transporter 550 from one of the test slots 310 with the manipulator 212, then pick up a disk drive 500 from one the totes 600 presented at the transfer station 400 with the disk drive transporter 550, and then return the disk drive transporter 550, with a disk drive 500 therein, to the test slot 310 for testing of the disk drive 500. After testing, the automated transporter 200 retrieves the tested disk drive 500 from the test slot 310, by removing the disk drive transporter 550 carrying the tested disk drive 500 from the test slot 310 (i.e., with the manipulator 212), carrying the tested disk drive 500 in the disk drive transporter 550 to the transfer station 400, and manipulating the disk drive transporter 550 to return the tested disk drive 500 to one of the totes 600 at the transfer station 400.

Figure 5:
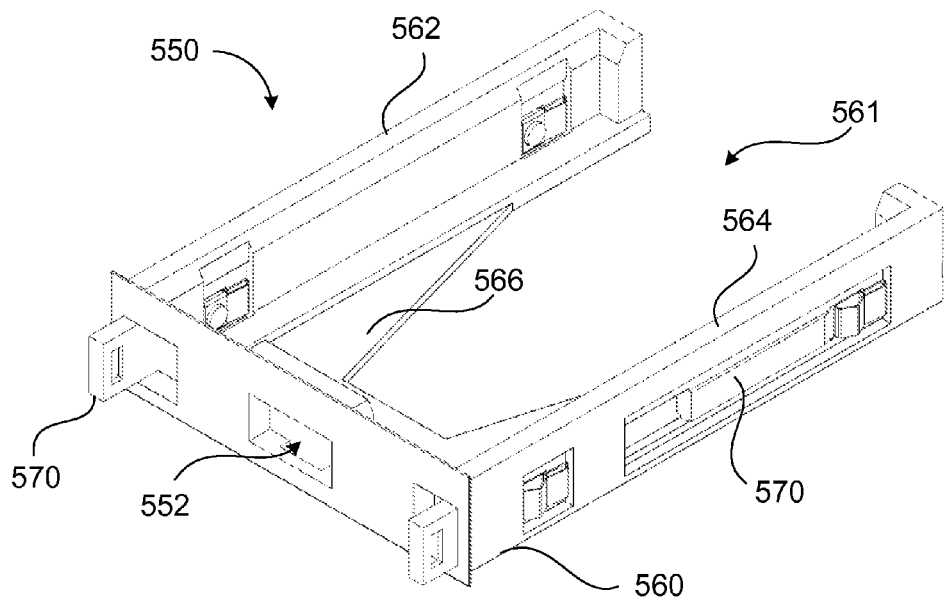
FIG. 5 is a perspective view of a disk drive transporter.
Figure 6:
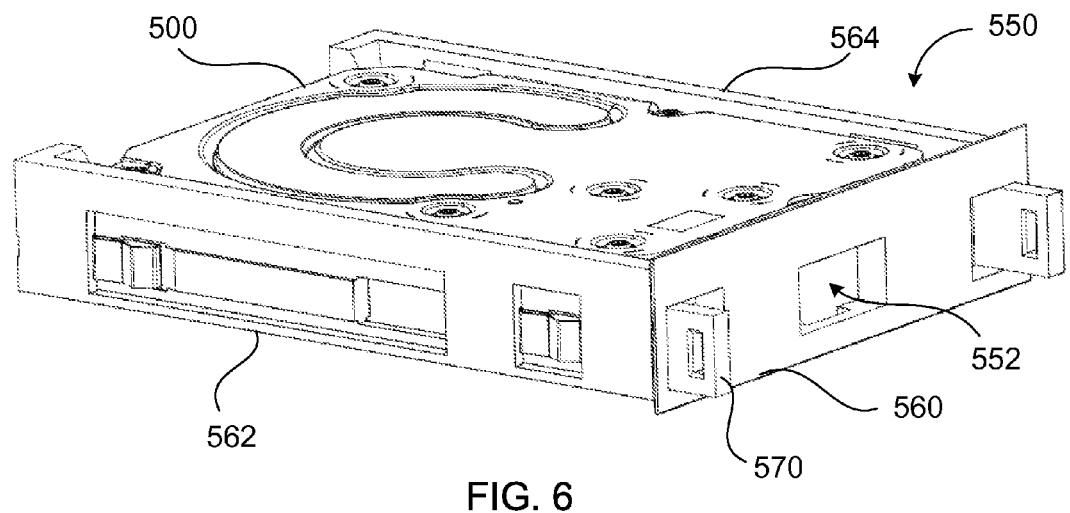
FIG. 6 is a perspective view of a disk drive transporter carrying a disk drive.
Figure 7:
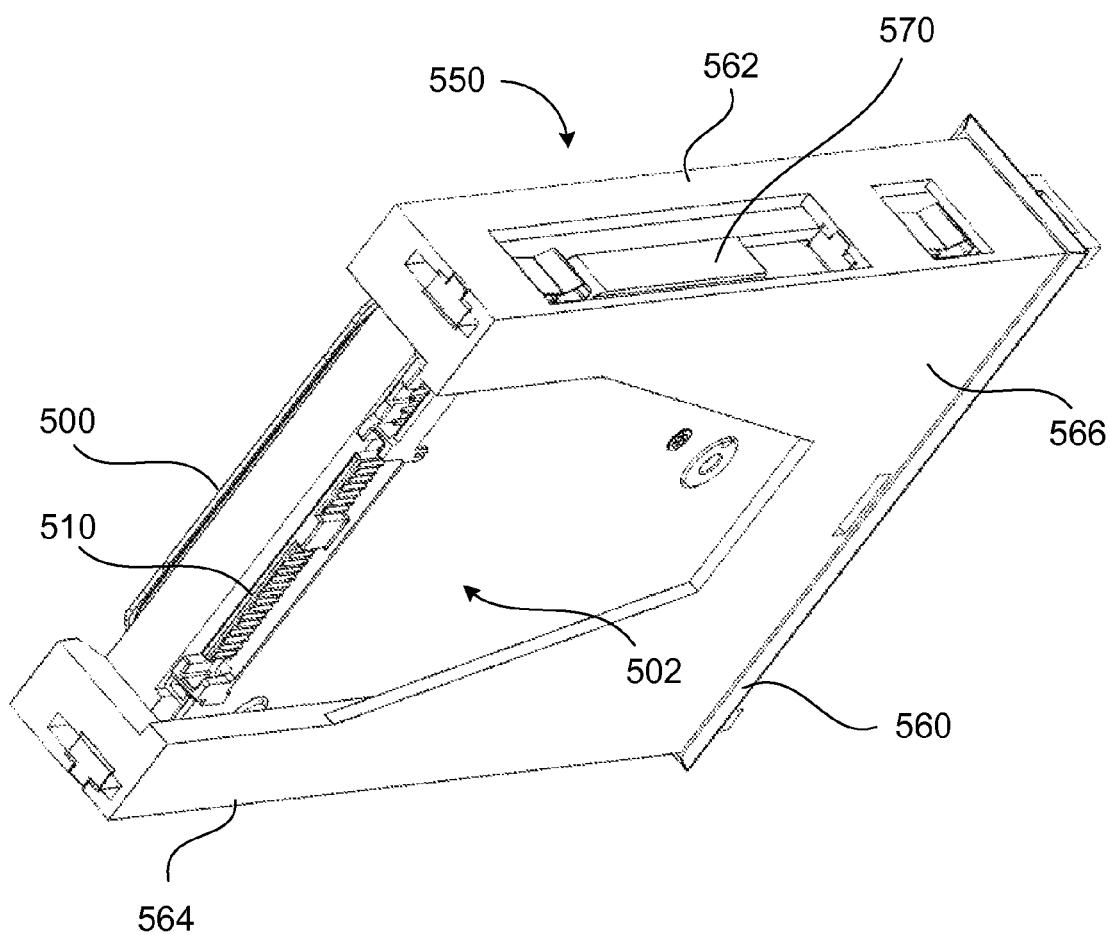
FIG. 7 is a bottom perspective view of a disk drive transporter carrying a disk drive.

The test slot 310, shown in FIG. 4, defines an opening 312 configured to receive the disk drive transporter 550, which in this case provides closure of the test slot 310. The disk drive transporter 550 is configured to receive the disk drive 500, as shown in FIG. 5, and be handled by the automated transporter 200. In use, one of the disk drive transporters 550 is removed from one of the test slots 310 with the robot 200 (e.g., by grabbing, or otherwise engaging, the indentation 552 of the transporter 550 with the manipulator 212 of the robot 200). In some examples, as illustrated in FIGS. 5-7, the disk drive transporter 550 includes a frame 560 defining a substantially U-shaped opening 561 formed by sidewalls 562, 564 and a base plate 566 that collectively allow the frame 560 to fit around a disk drive support (not shown) in the tote 600 so that the disk drive transporter 550 can be moved (e.g., via the robotic arm 200) into a position beneath one of the disk drives 500 housed in one of multiple disk drive receptacles 620 defined by the tote 600 (see e.g., FIGS. 8-9). The disk drive transporter 550 can then be raised (e.g., by the robotic arm 200) into a position engaging the disk drive 600 for removal from the tote 600.

With the disk drive 500 in place within the frame 560 of the disk drive transporter 550, the disk drive transporter 550 and the disk drive 500 together can be moved by the automated transporter 200 for placement within one of the test slots 310, as shown in FIG. 4. In some implementations, the manipulator 212 is also configured to initiate actuation of a clamping mechanism 570 disposed in the disk drive transporter 550. This allows actuation of the clamping mechanism 570 before the transporter 550 is moved from the tote 600 to the test slot 310 to inhibit movement of the disk drive 500 relative to the disk drive transporter 550 during the move. Prior to insertion in the test slot 310, the manipulator 212 can again actuate the clamping mechanism 570 to release the disk drive 500 within the frame 560. This allows for insertion of the disk drive transporter 550 into one of the test slots 310, until the disk drive 500 is in a test position with a disk drive connector 510 engaged with a test slot connector (not shown). The clamping mechanism 570 may also be configured to engage the test slot 310, once received therein, to inhibit movement of the disk drive transporter 550 relative to the test slot 310. In such implementations, once the disk drive 500 is in the test position, the clamping mechanism 570 is engaged again (e.g., by the manipulator 212) to inhibit movement of the disk drive transporter 550 relative to the test slot 310. The clamping of the transporter 550 in this manner can help to reduce vibrations during testing. In some examples, after insertion, the disk drive transporter 550 and disk drive 500 carried therein are both clamped or secured in combination or individually within the test slot 310.

Figure 8:
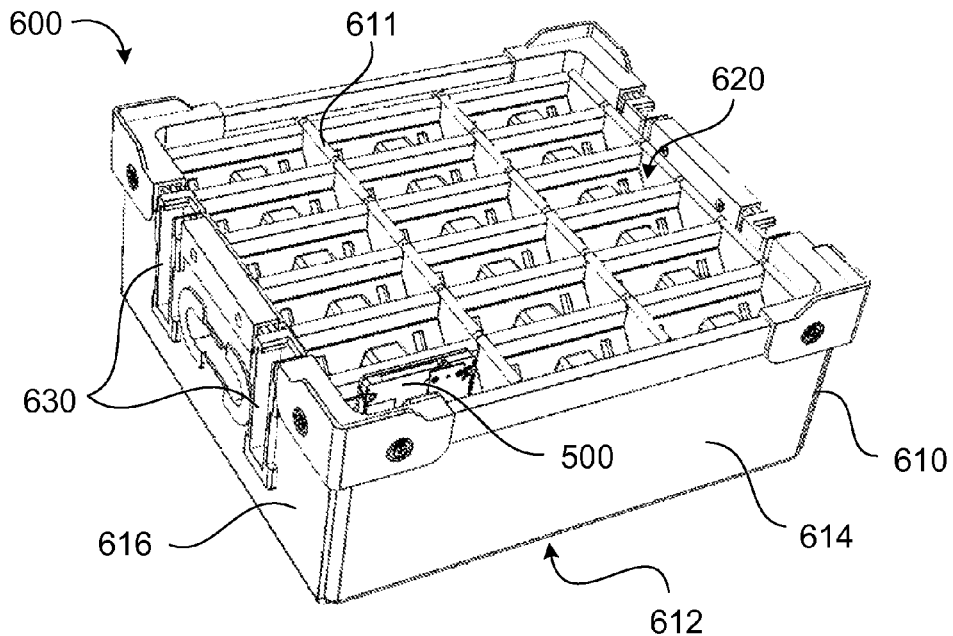
FIG. 8 is a perspective view of a disk drive tote in a loading position.
Figure 9:
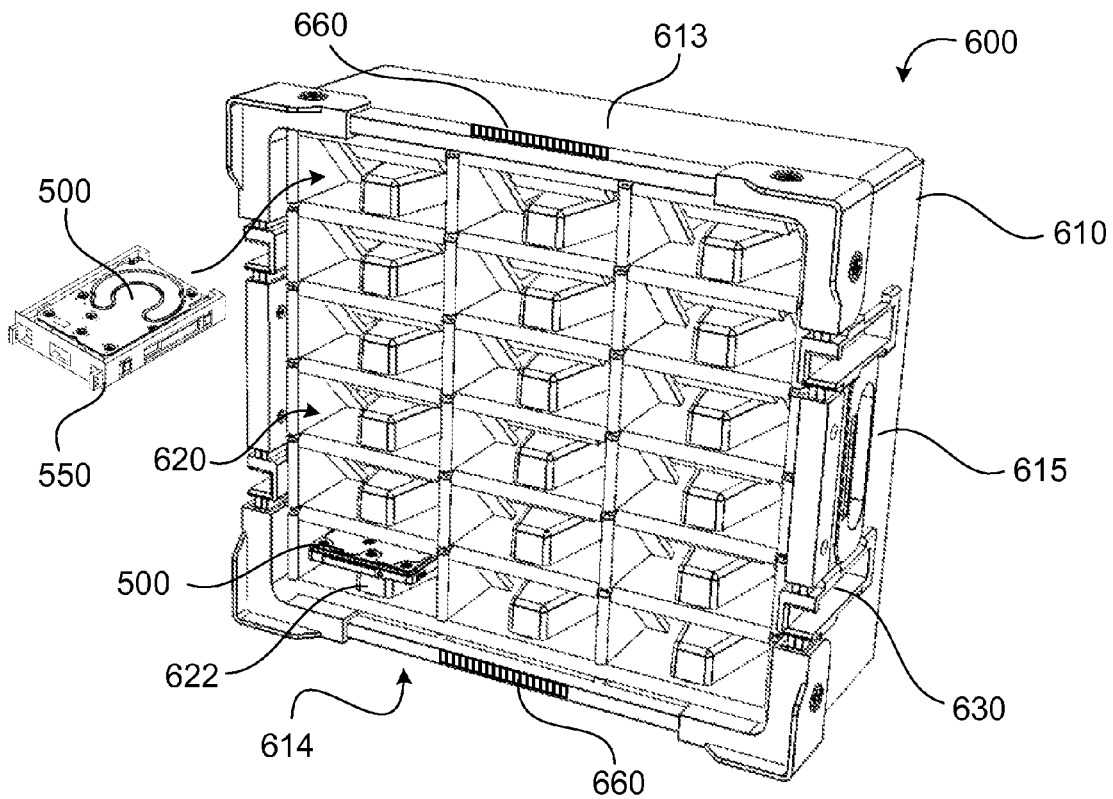
FIG. 9 is a perspective view of a disk drive tote in a presentation position.

In the example illustrated in FIGS. 8-9, the tote 600 includes a tote body 610 having a front side 611, a back side 612, a top side 613, a bottom side 614, a right side 615 and a left side 616. The tote body 610 defines multiple disk drive receptacles 620 in the front side 611 that are each configured to house a disk drive 500. In some examples, the tote 600 rests on its back side 612 while in the loading position, such that the disk drive receptacles 620 are substantially vertical and face upward, as shown in FIG. 8. In other examples, the tote 600 is held in another orientation while in the loading position, such as at an incline or in a vertical orientation, as with the presentation position. In the presentation position, the tote 600 rests on its bottom side 614, such that the disk drive receptacles 620 are substantially horizontal and face laterally, as shown in FIG. 9. The tote body 610 defines arm grooves 630 in the right and left sides 615, 616 of the tote body 610 that are configured to support the tote 600. Other presentation positions are possible as well. The tote 600 can be held in an inclined position, while in the presentation position, such that any disk drives 500 housed in the disk drive receptacles 620 slide to the back of the disk drive receptacles 620. In some examples, the tote body 610 is configured such that the tote rests in an inclined position. In other examples, the disk drive supports 622 hold the totes 600 at inclined positions, which in some cases may be variable (e.g. set by an adjustment screw, lever, or actuator).

In the example shown, each disk drive receptacle 620 includes a disk drive support 622 configured to support a central portion 502 (see FIG. 7) of the received disk drive 500 to allow manipulation of the disk drive 500 along non-central portions. In some implementations, the disk drive support 622 is configured to support the disk drive 500 at an incline, while the tote 600 is in a substantially vertical orientation, such that the disk drive 500 has a tending to slide deeper into the disk drive receptacle 620, rather than out of the disk drive receptacle 620, when the tote 600 is resting on its bottom side 614. To remove a housed disk drive 500 from the disk drive receptacle 620, the disk drive transporter 550 is positioned below the disk drive 500 (e.g. by the robotic arm 200) in the disk drive receptacle 620 and elevated to lift the disk drive 500 off of the disk drive support 622. The disk drive transporter 550 is then removed from the disk drive receptacle 620 while carrying the disk drive 500 for delivery to a destination target, such as a test slot 310.

Figure 10:
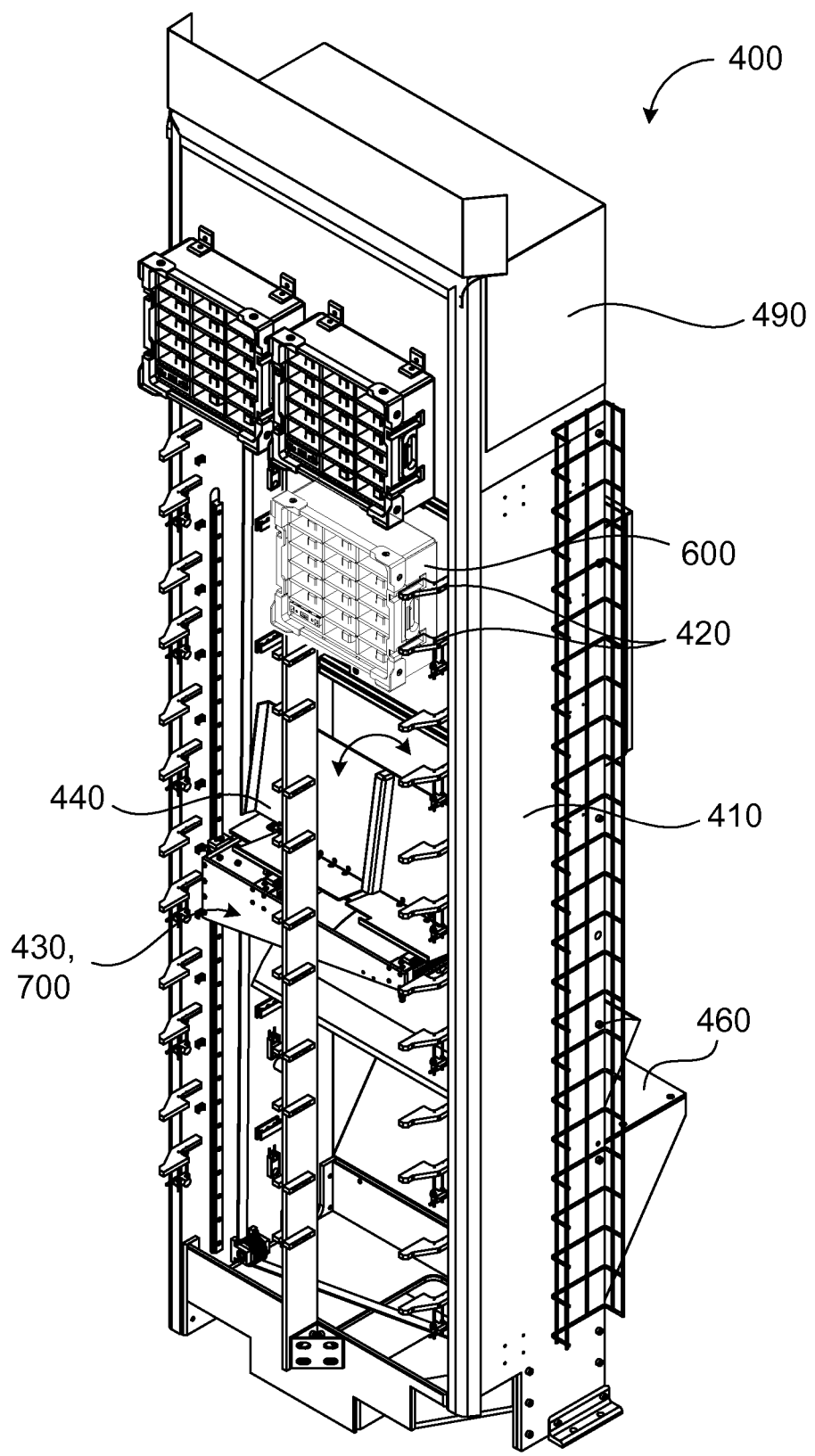
FIG. 10 is a perspective view of a transfer station.

Referring to FIG. 10, in some implementations, the transfer station 400 includes a transfer station housing 410 and multiple tote presentation support systems 420 disposed on the transfer station housing 410. Each tote presentation support system 420 is configured to receive and support a disk drive tote 600 in a presentation position for servicing by the disk drive testing system 100. In some examples, the tote presentation support systems 420 have adjustable spacing to accommodate different sizes of totes 600 or to present totes 600 at specific locations with respect to the automated transporter 200.

Figure 11:
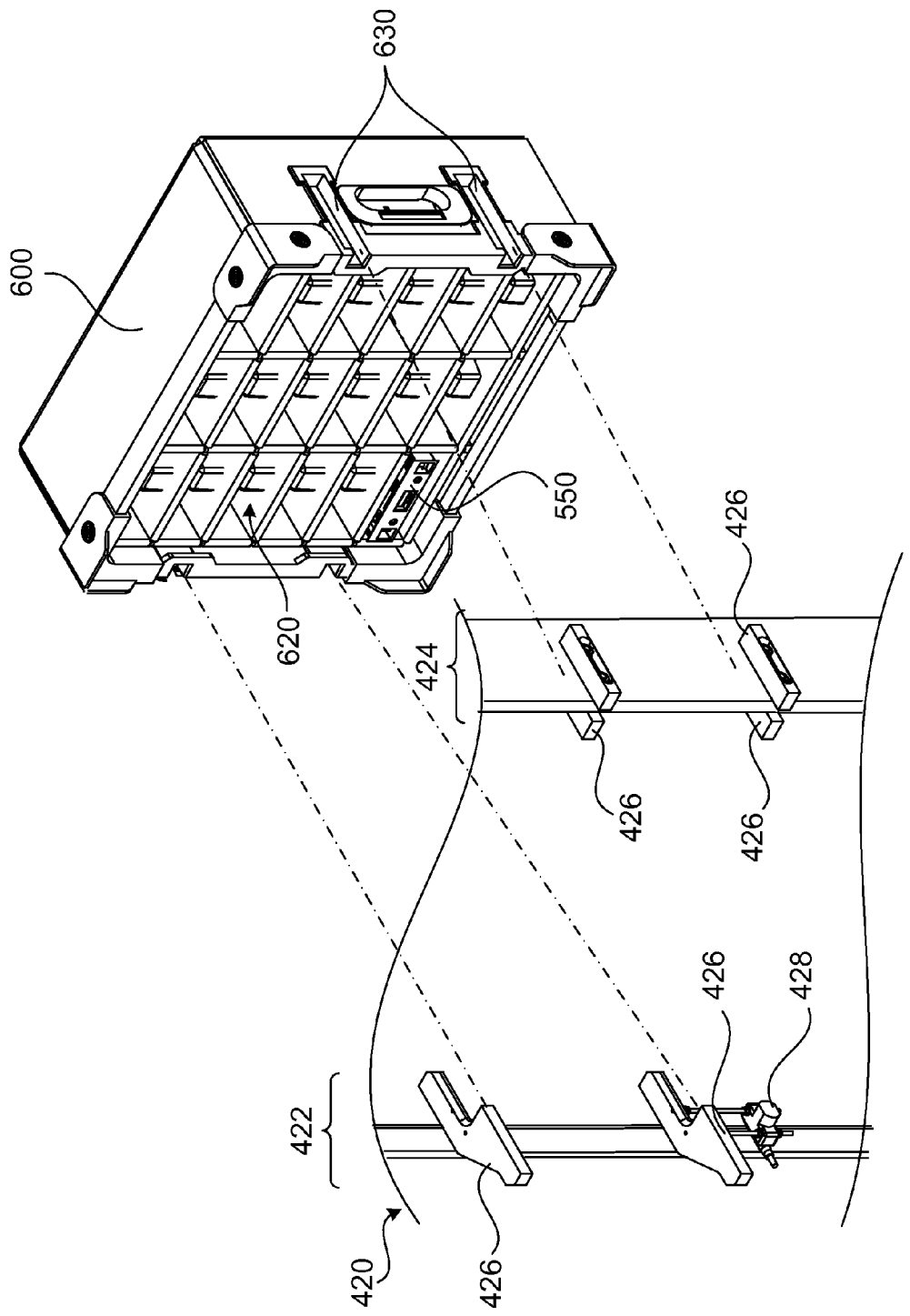
FIG. 11 is a perspective view of a tote in a presentation position for placement on a tote presentation support system of a transfer station.

In some implementations, the tote presentation support systems 420 are each disposed on the same side of the transfer station housing 410 and arranged vertically with respect to each other. Each tote presentation support systems 420 has a different elevation with respect to the others. In some examples, as shown in FIG. 11, the tote presentation support system 420 includes first and second opposing pairs 422, 424 of tote support arms 426 configured to be received by respective arm grooves 630 defined by the tote body 610 of the disk drive tote 600. The first and second pairs 422, 424 of tote support arms 426 are configured to key-in the respective tote 600 to a specific position, which can be known by the automated transporter 200. In one example, the tote 600 is moved (e.g. by the tote mover 430) horizontally onto the respective tote support arms 426, followed by an incremental movement down and out to set the arm grooves 630 of the tote 600 in the keyed presentation position on the respective tote support arms 426. Holding the tote 600 at a specific predetermined position allows the automated transporter 200 to access the tote 600 without knocking into the tote 600. In some implementations, the tote 600 is locked in place in the presentation position by a tote lock 428 (e.g. mechanical, pneumatic, or solenoid locking mechanism) disposed on the tote presentation support systems 420.

Referring again to FIG. 10, a tote mover 430 is disposed on the transfer station housing 410 and is configured to move a pivotally coupled tote loading support 440, which is configured to receive and support a disk drive tote 600. The tote loading support 440 pivots and moves between a first position and a second position. The tote mover 430 is configured to move the tote loading support 440 between the first position, for holding a disk drive tote 600 in a loading position (e.g. in a horizontal orientation at the loading support's first position), and the second position, for holding a disk drive tote 600 in the presentation position (e.g. in a substantially vertical orientation) at one of the tote presentation support systems 420 for servicing by the disk drive testing system 100 (e.g. by the robotic arm 200). In some examples, the tote presentation support system 420 holds the tote 600 at a slightly inclined (e.g. off vertical) orientation to keep disk drives 500 from accidentally slipping out of the tote 600. The tote mover 430 maximizes the available input of totes 600 presented to the disk drive testing system 100. Furthermore, the tote mover 430 allows totes 600 to be delivered to the transfer station 400 at an ergonomic height and in an ergonomic position or manner (e.g. the loading position). The tote mover 430 then moves the totes 600 to their presentation positions, which are not necessarily accessible by or ergonomic for an operator, but are accessible by the automated transporter 200.

Figure 12:
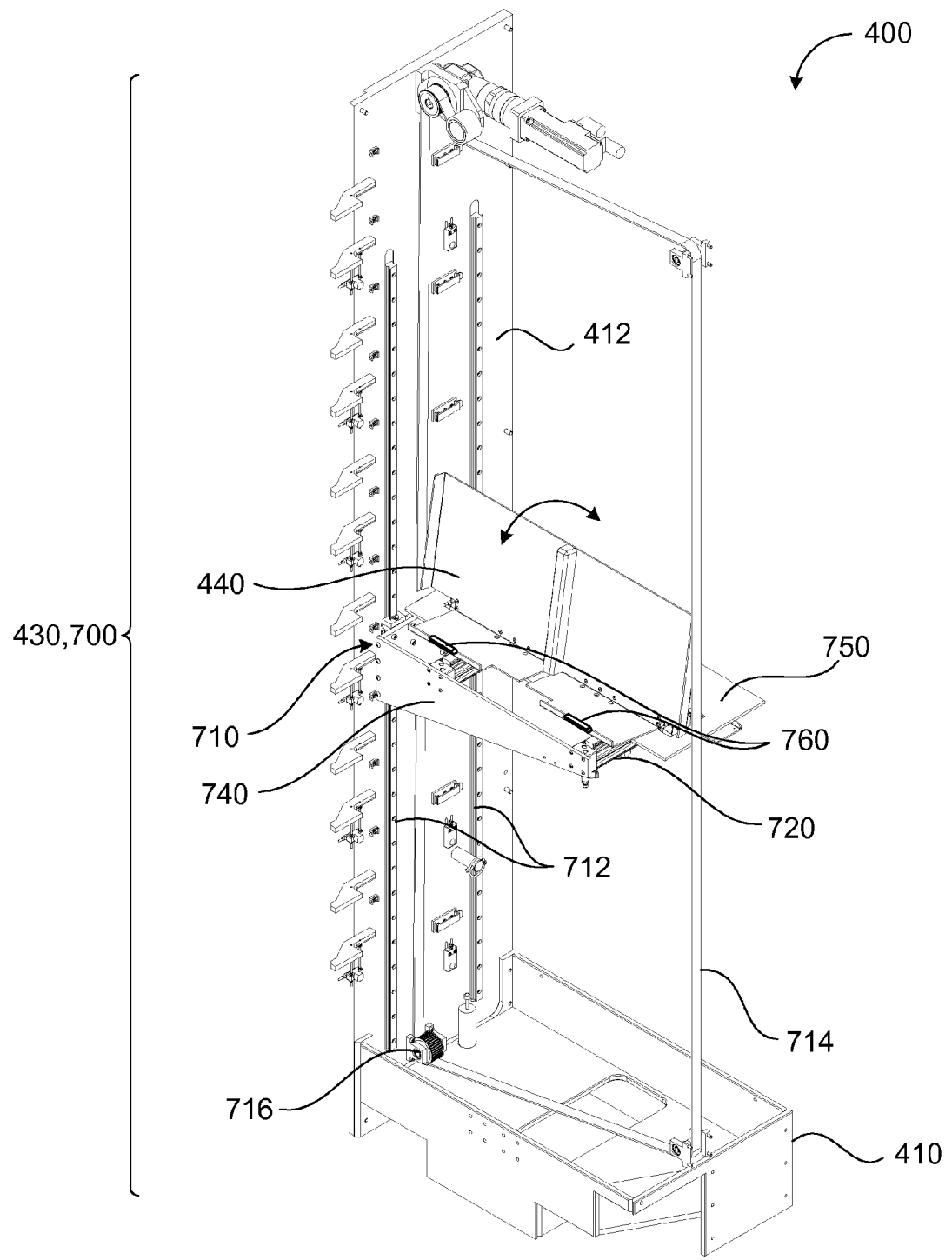
FIG. 12 is a front perspective view of a tote mover disposed on a transfer station.
Figure 13:
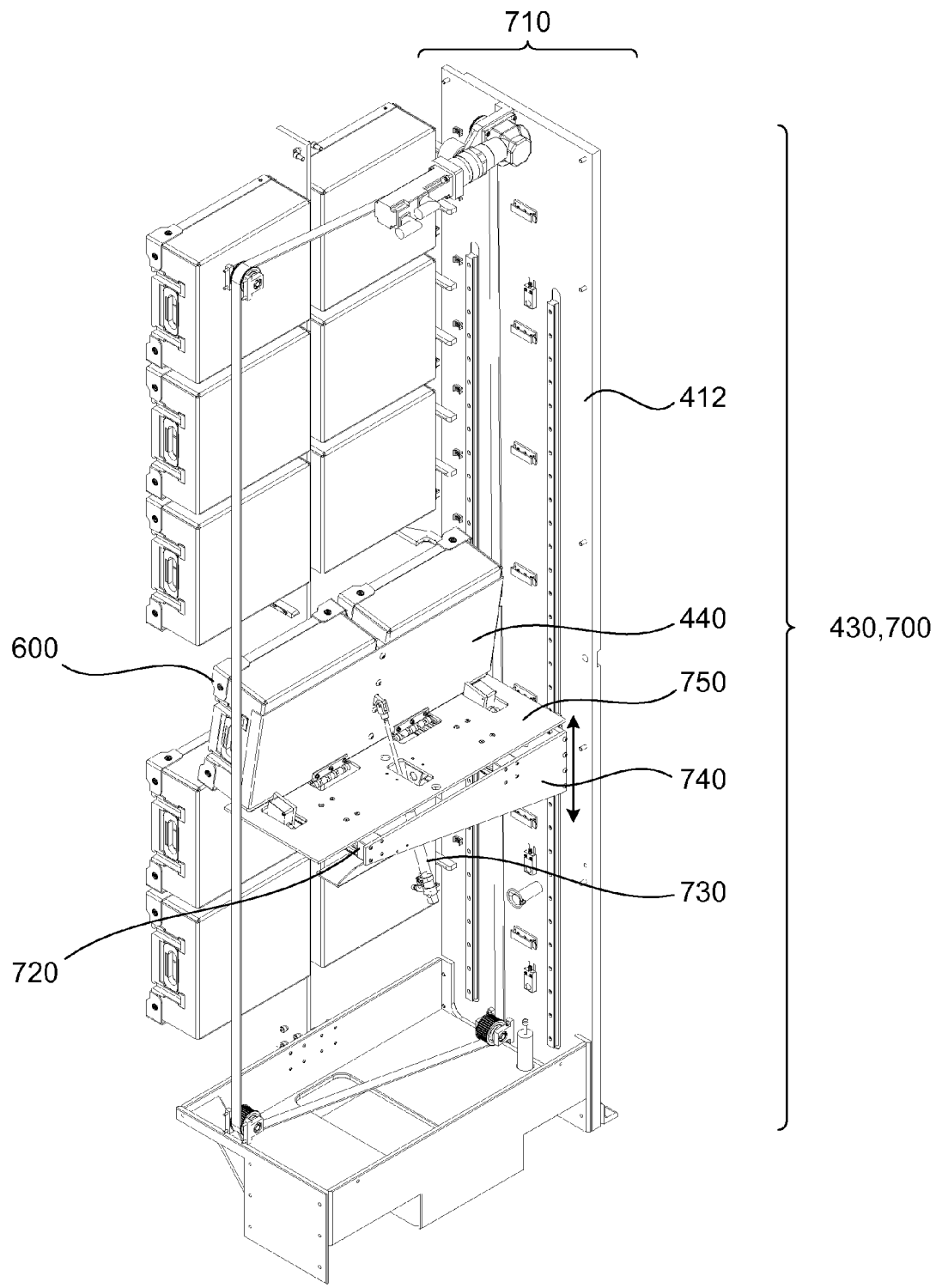
FIG. 13 is a rear perspective view of the tote mover shown in FIG. 12.
Figure 14:
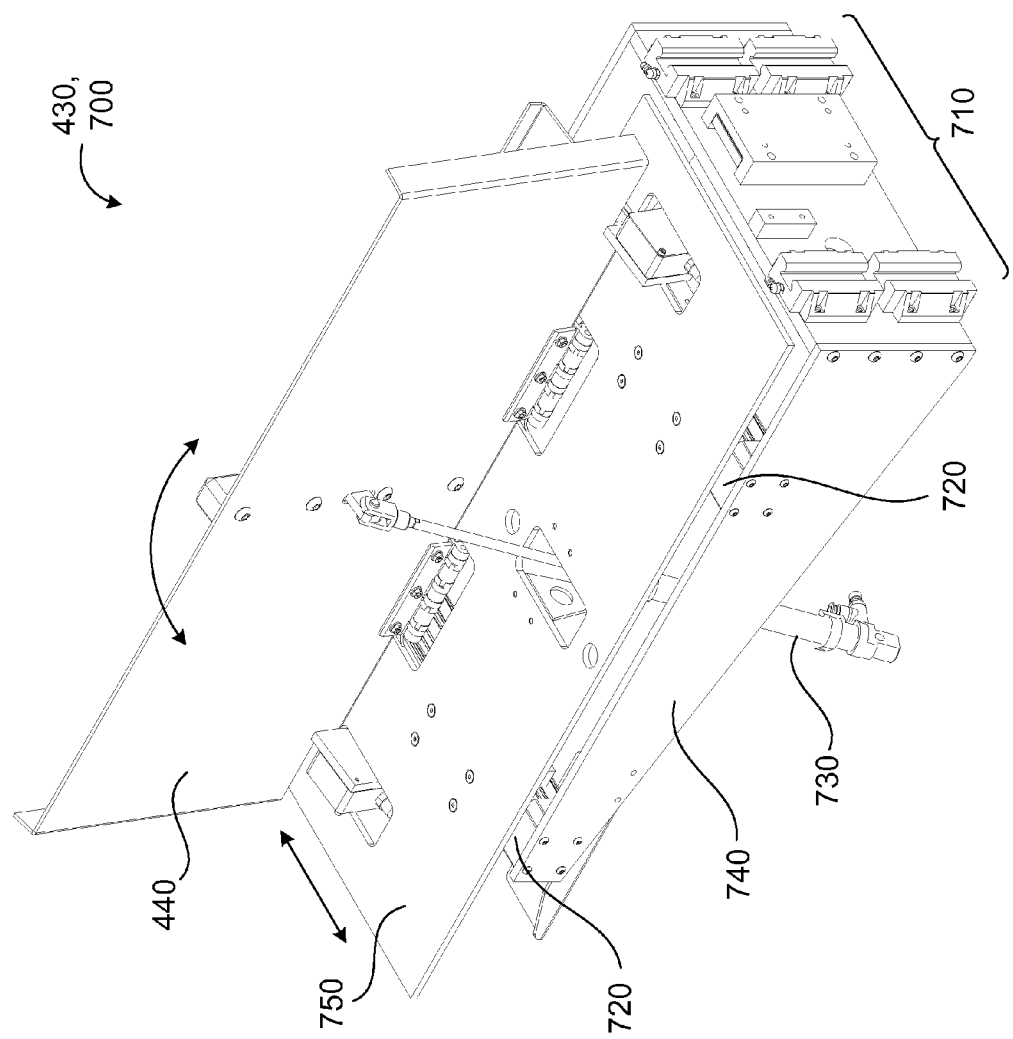
FIG. 14 is a rear elevated perspective view of the tote mover shown in FIG. 12.

In some examples, as shown in FIGS. 12-14, the tote mover 430 includes a multi-axis actuator assembly 700 having a vertical actuator 710, a horizontal actuator 720, and a pitch actuator 730. The vertical actuator 710 is disposed on a side wall 412 of the transfer station housing 410 and controls an elevation of the tote loading support 440. A lift carriage 740 couples the vertical actuator 710 to the horizontal actuator 720, which controls a lateral position of the tote loading support 440. A lift table 750 is attached to the horizontal actuator 720, which may include a pair of linear actuators as shown. The tote loading support 440 is pivotally attached to both the horizontal actuator 720 (e.g. via the lift table 750) and the pitch actuator 730, which controls a pitch of the tote loading support 440. Each actuator 710, 720, 730 can be ball screw, hydraulic, or belt driven, among other suitable means of driving the actuators 710, 720, 730. In the example shown in FIG. 12, the vertical actuator 710 includes a slide guide 712 driven by a belt 714 via a coupled motor 716. After an operator places a disk drive tote 600 on the tote loading support 440 in the loading position, the operator enables the tote mover 430 to move the disk drive tote 600 to the presentation position at one of the tote presentation support systems 420. In some examples, the transfer station 400 houses a controller 490 (see FIGS. 10 & 15) in communication with the tote mover 430. The controller 490 directs the tote mover 430 to move the disk drive tote 600 to the presentation position at a specific tote presentation support system 420 based on either a user input (e.g. via user interface allowing the operator to specify a destination tote presentation support system 420) or a program or control algorithm that monitors and allocates availability of tote presentation support systems 420. In some examples, the transfer station 400 includes a marking reader 760 (see FIG. 12), such as a barcode reader, disposed on the tote mover 430 (in the case shown, on the lift table 750) that reads the makings 660 on the totes 600 (e.g. while in the loading position) and moves the totes 600 to their respective presentation positions based on their marking properties. To move the disk drive tote 600 to the presentation position at one of the tote presentation support systems 420, the vertical actuator 710 alters an elevation of the disk drive tote 600 to coincide with an elevation of a destination tote presentation support system 420. The pitch actuator 730 alters a pitch of the tote loading support 440 to move a supported disk drive tote 600 to the presentation position. The horizontal actuator 720, and optionally the vertical and pitch actuators 710, 730, moves the disk drive tote 600 onto a destination tote presentation support system 420. Preferably, the pitch actuator 730 alters a pitch of the disk drive tote 600 to move from the loading position to the presentation position before the vertical actuator 710 changes an elevation of the disk drive tote 600 to coincide with an elevation of the destination tote presentation support system 420. The tote mover 430 can maintain a relatively smaller footprint while altering the elevation of the disk drive tote 600 in a substantially vertical orientation. Preferably, the tote loading support 440 supports the disk drive tote 600 at a slightly inclined (e.g. off vertical) orientation while moving the disk drive tote 600, as to keep disk drives 500 from accidentally slipping out of the disk drive tote 600. The actuators 710, 720, 730 cooperate in similar manner, but in reverse, to move the disk drive tote 600 from the presentation position at one of the tote presentation support systems 420 back to the loading position for servicing by an operator.

In some implementations, the first position of the tote loading support 440 is substantially horizontal and the second position of the tote loading support 440 is substantially vertical. In other implementations, the first position of the tote loading support 440 is at an angle with a horizontal plane (e.g. to accommodate a particular ergonomic placement of the disk drive tote 600).

Figure 15:
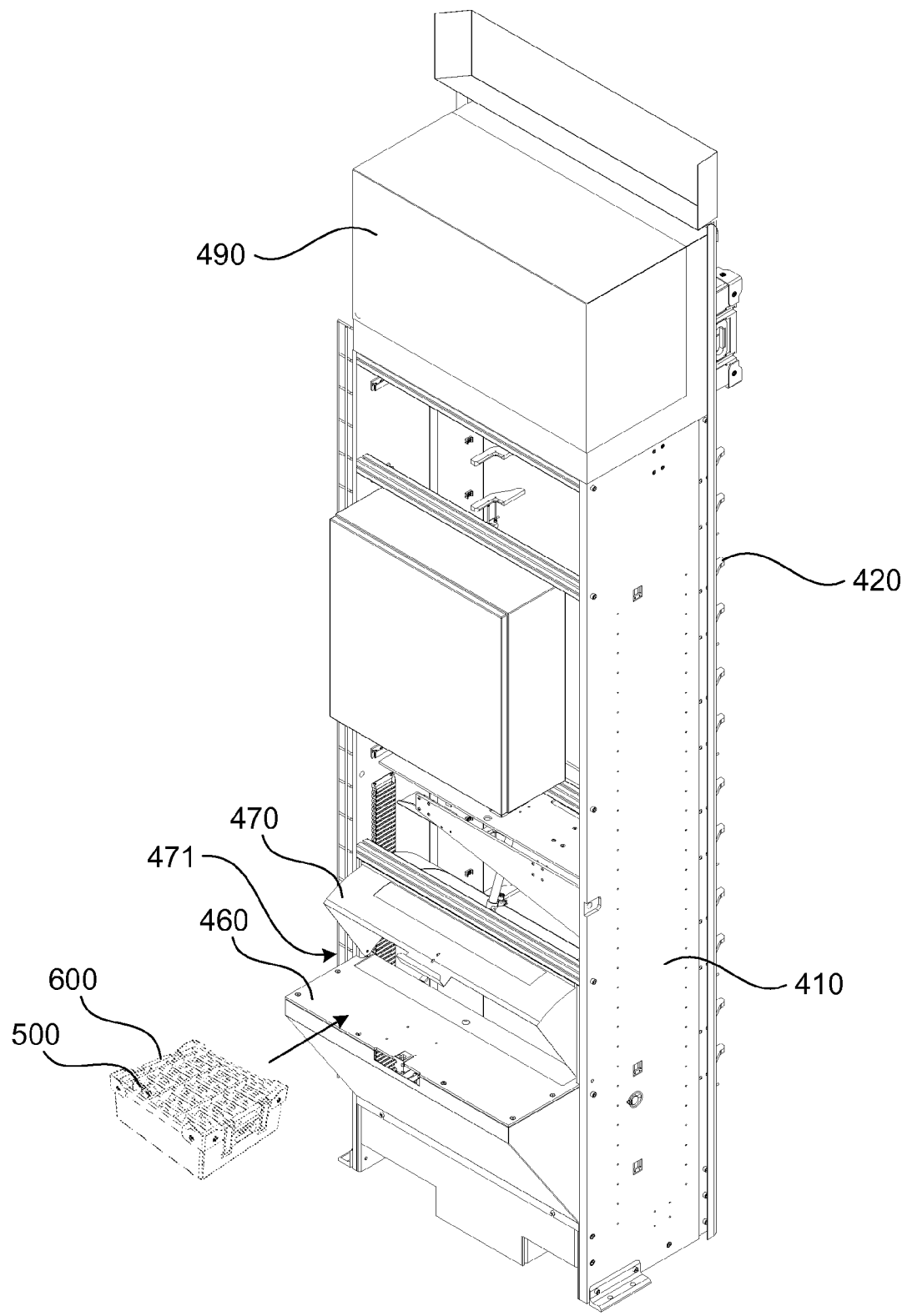
FIG. 15 is a rear perspective view of a transfer station having a staging platform and door.

In some implementations, the transfer station 400 includes a staging platform 460, as shown in FIG. 15, disposed on the transfer station housing 410 and configured to receive a disk drive tote 600 for transferring to and from the tote loading support 440. In the example shown, the staging platform 460 is disposed on an opposite side of the transfer station housing 410 of the tote presentation support systems 420. An operator may place or slide (e.g. from a cart) a disk drive tote 600 carrying disk drives 550 onto the staging platform 460 and then move the disk drive tote 600 onto the tote loading support 440 to the loading position. In some examples, the transfer station 400 includes a door 470 pivotally attached to the transfer station housing 410 and configured to provide a closure over the staging platform 460 and/or a tote supply opening 471 defined by the transfer station housing 410 while in a closed position. When the door 470 is in an open position, allowing access to the tote loading support 440, the tote mover 430 is disabled for safety reasons.

Figures 16, 17:
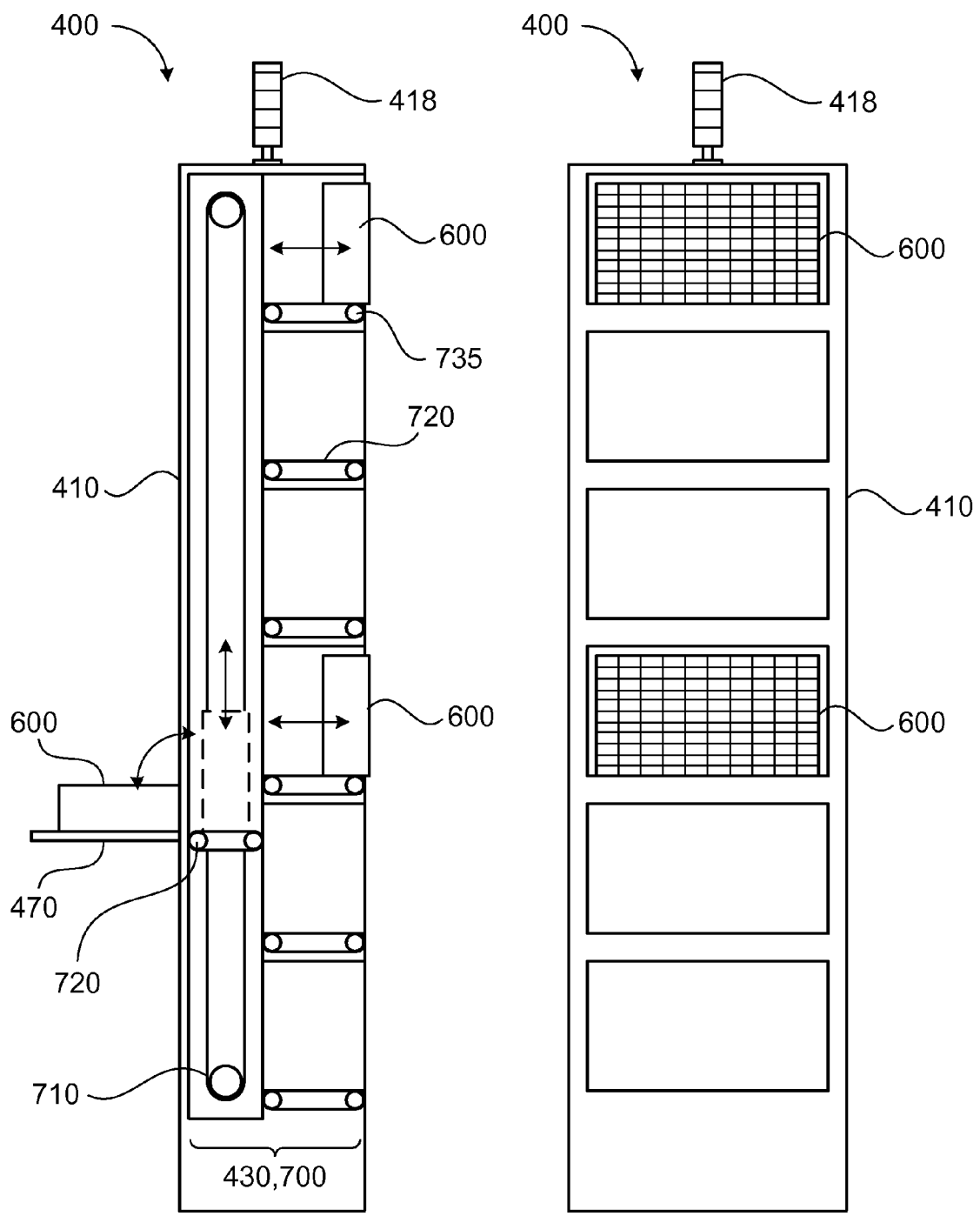
FIG. 16 is a side view of a transfer station.
FIG. 17 is a font view of the transfer station shown in FIG. 16.

Referring to FIGS. 16-17, in some implementations, the transfer station 400 includes a tote mover 430 having a multi-axis actuator assembly 700 that includes a vertical actuator 710 and a horizontal actuator 720. In the example shown, the vertical actuator 710 is a belt driven lines actuator and the horizontal actuator 720 is a first conveyer belt assembly coupled to the vertical actuator 710. Each tote presentation support system 420 disposed on the transfer station housing 410 includes a presentation actuator 735 configured to receive and support a disk drive tote 600 in a presentation position for servicing by the disk drive testing system 100. The presentation actuator 735 is a second conveyer belt assembly. The transfer station 400 includes a door 470 pivotally attached to the transfer station housing 410 and operable to pivot between an open position, for receiving and supporting a disk drive tote 600, and a closed position, for placing the disk drive tote 600 in the loading position on the horizontal actuator 720. The tote mover 430 moves the disk drive tote 600 to one of the tote presentation support systems 420. The horizontal actuator 720 advances the disk drive tote 600 onto the presentation actuator 735, which moves the disk drive tote 600 to the presentation position for servicing by the disk drive testing system 100 (e.g. by the robotic arm 200).

In some examples, the transfer station 400 includes a station indicator 418 which provides visual, audible, or other recognizable indications of one or more states of the transfer station 400. In one example, the station indicator 418 includes lights (e.g. LEDs) that indicate when one or more totes 600 need servicing (e.g. to load/unload disk drive totes 600 to/from the transfer station 400). In another example, the station indicator 418 includes one or more audio devices to provide one or more audible signals (e.g. chirps, clacks, etc.) to signal an operator to service the transfer station 400.

A method of performing disk drive testing includes presenting multiple disk drives 500 to a disk drive testing system 100 for testing and actuating an automated transporter 200 (e.g. robotic arm) to retrieve one of the disk drives 500 from the disk drive tote 600 and deliver the retrieved disk drive 500 to a test slot 310 of a rack 300 of the disk drive testing system 100. The method includes actuating the automated transporter 200 to insert the disk drive 500 in the test slot 310, and performing a functionality test on the disk drive 500 received by the test slot 310. The method may also include actuating the automated transporter 200 to retrieve the tested disk drive 500 from the test slot 310 and deliver the tested disk drive 500 back to a destination location.

In retrieving one of the presented disk drives 500 for testing, the method preferably includes actuating the automated transporter 200 to retrieve a disk drive transporter 550 (e.g. from a test slot 310 housed in a rack 300), and actuating the automated transporter 200 to retrieve one of the disk drives 500 from the transfer station 400 and carry the disk drive 500 in the disk drive transporter 550. The method includes actuating the automated transporter 200 to deliver the disk drive transporter 550 carrying the disk drive 500 to the test slot 310 for performing a functionality test on the disk drive 500 housed by the received disk drive transporter 550 and the test slot 310. In some examples, delivering the disk drive transporter 550 to the test slot 310 includes inserting the disk drive transporter 550 carrying the disk drive 500 into the test slot 310 in the rack 300, establishing an electric connection between the disk drive 500 and the rack 300. After testing is completed on the disk drive 500, the method includes actuating the automated transporter 200 to retrieve the disk drive transporter 550 carrying the tested disk drive 500 from the test slot 310 and deliver the tested disk drive 500 back to a destination location, such as a destination disk drive tote 600 on the transfer station 400. In some implementations, the rack 300 and two or more associated test slots 310 are configured to move disk drives 500 internally from one test slot 310 to another test slot 310, in case the test slots 310 are provisioned for different kinds of tests.

In some examples, the method includes actuating the automated transporter 200 to deposit the disk drive transporter 550 in the test slot 310 after depositing the tested disk drive 500 at a destination location (e.g. in a disk drive receptacle 620 of a destination disk drive tote 600), or repeating the method by retrieving another disk drive 500 for testing (e.g. from the disk drive receptacle 620 of a source disk drive tote 600).

A method of supplying or presenting disk drives 500 to the disk drive testing system 100 includes loading multiple disk drives 500 into a disk drive tote 600, placing the disk drive tote 600 in the loading position on a transfer station 400, and actuating the tote mover 430 of the transfer station 400 to move the disk drive tote 600 from the loading position to the presentation position for servicing by the disk drive testing system 100. The disk drive tote 600 is supported in the presentation position by one of multiple tote presentation support systems 420 disposed on the transfer station housing 410 and arranged vertically with respect to each other. Multiple disk drive totes 600, each housing disk drives 500, can be sequentially placed in the loading position on the transfer station 400 and moved by the tote mover 430 to its respective presentation position at one of the multiple tote presentation support systems 420 for servicing by the disk drive testing system 100.

In some examples, the method includes opening a door 470 pivotally attached to the transfer station housing 410 to an open position. The door 470 is configured to provide closure of a tote supply opening 471 defined by the transfer station housing 410 and is operable to receive and support the disk drive tote 600. The method includes placing the disk drive tote 600 in a preloading position on the door 470 and closing the door 470, by rotating the door 470 to a closed position, thereby placing the disk drive tote 600 in the loading position.

A method of performing disk drive testing includes placing a disk drive tote 600 carrying multiple disk drives 500 in a loading position on a transfer station 400, actuating the transfer station 400 to move the disk drive tote 600 from the loading position to a presentation position for servicing by an automated transporter 200. The method includes actuating the automated transporter 200 to retrieve one of the disk drives 500 from the disk drive tote 600 and delivering the disk drive 500 to a test slot 310. The method includes actuating the automated transporter 200 to insert the disk drive 500 in the test slot 310, and performing a functionality test on the disk drive 500 received by the test slot 310. The method may also include actuating the automated transporter 200 to retrieve the tested disk drive 500 from the test slot 310 and deliver the tested disk drive 500 back to the transfer station 400. In some examples, the method includes loading multiple disk drive totes 600 carrying disk drives 500 onto the transfer station 400 by sequentially placing each disk drive tote 600 in the loading position on the transfer station 400 and actuating the transfer station 400 to move each disk drive tote 600 to a respective presentation position for servicing by the automated transporter 200. The method may include actuating the automated transporter 200 to retrieve a disk drive transporter 550 (e.g. from the test slot 310), and retrieve and carry the disk drive 500 in the disk drive transporter 550 to deliver the disk drive 500 to the test slot 310.

A number of implementations have been described. Nevertheless, it will be understood that various modifications may be made without departing from the spirit and scope of the disclosure. Accordingly, other implementations are within the scope of the following claims.

What is claimed is:

1. A method comprising:
performing one or more of first operations or second operations;
wherein the first operations comprise:
loading, by a first disk drive tote, multiple disk drives into a disk drive testing system;
actuating an automated transporter to retrieve a first disk drive from the multiple disk drives in the first disk drive tote;
actuating the automated transporter to deliver the first disk drive to a first test slot of the disk drive testing system;
inserting the first disk drive in the first test slot; and
unloading the first disk drive tote from the disk drive testing system; and
wherein the second operations comprise:
loading a second disk drive tote into the disk drive testing system;
actuating the automated transporter to retrieve a second disk drive from a second test slot of the disk drive testing system;
actuating the automated transporter to deliver the second disk drive to the second disk drive tote; and
unloading, by the second disk drive tote, the second disk drive from the disk drive testing system.

2. The method of claim 1, further comprising:
actuating the automated transporter to retrieve a disk drive transporter;
wherein actuating the automated transporter to retrieve the first disk drive comprises:
actuating the automated transporter to retrieve the first disk drive from the first disk drive tote by using the disk drive transporter to carry the first disk drive; and
wherein actuating the automated transporter to deliver the first disk drive to the first test slot comprises:
actuating the automated transporter to deliver the disk drive transporter carrying the first disk drive to the first test slot.

3. The method of claim 2, wherein the automated transporter retrieves the first disk drive from the first disk drive tote with the disk drive transporter by performing operations comprising:
positioning the disk drive transporter below the first disk drive;
lifting the first disk drive off a disk drive support of the first disk drive tote; and
carrying the first disk drive in the disk drive transporter away from the first disk drive tote.

4. The method of claim 2, wherein the disk drive transporter, carrying the first disk drive, is inserted into the first test slot, engaging the first disk drive with a connector of the disk drive testing system, and providing closure of the first test slot.

5. The method of claim 1, wherein the first disk drive tote is held in a presentation position by a transfer station configured to hold multiple disk drive totes in the presentation position for servicing by the automated transporter.

6. The method of claim 1, further comprising:
actuating the automated transporter to retrieve a third disk drive from the multiple disk drives in the first disk drive tote; and
actuating the automated transporter to deliver the retrieved third disk drive to a third test slot of the disk drive testing system and to insert the third disk drive in the third test slot.

7. The method of claim 1, wherein the first disk drive tote is supported in a presentation position by a tote presentation support system.

8. The method of claim 7, wherein the tote presentation support system comprises first and second opposing pairs of tote support arms configured to be received by respective arm grooves defined by a tote body of the first disk drive tote.

9. The method of claim 1, further comprising:
placing the first disk drive tote in a loading position on a transfer station; and
actuating the transfer station to move the first disk drive tote from the loading position to a presentation position for servicing by the automated transporter.

10. The method of claim 9, further comprising:
reading a tote marking on the first disk drive tote; and wherein actuating the transfer station to move the first disk drive tote comprises:
actuating the transfer station to move the first disk drive tote from the loading position to the presentation position based on the tote marking.

11. The method of claim 10, wherein the tote marking comprises a barcode.

12. The method of claim 10, wherein the tote marking comprises a color marking.

13. The method of claim 10, further comprising assigning the first disk drive tote a function property that affects usage of the first disk drive tote in the disk drive testing system.

14. The method of claim 13, wherein the function property is dynamically re-assignable during usage of the first disk drive tote in the disk drive testing system.

15. The method of claim 9, wherein the transfer station comprises:
a transfer station housing;
multiple tote presentation support systems disposed on the transfer station housing, a tote presentation support system configured to receive and to support at least the first disk drive tote in the presentation position for servicing by the disk drive testing system; and
a tote mover disposed on the transfer station housing and configured to move at least the first disk drive tote between the loading position and the presentation position at one of the multiple tote presentation support systems.

16. A method comprising:
performing one or more of first operations or second operations;
wherein the first operations comprise:
loading multiple disk drives into a first disk drive tote;
placing the first disk drive tote in a loading position on a transfer station;
loading, by the first disk drive tote in the loading position, the multiple disk drives into a disk drive testing system;
actuating a tote mover of the transfer station to move the first disk drive tote from the loading position to a presentation position for retrieval of at least one of the multiple disk drives by the disk drive testing system; and
unloading the first disk drive tote from the disk drive testing system; and
wherein the second operations comprise:
placing a second disk drive tote in the loading position on the transfer station;
loading the second disk drive tote into the disk drive testing system;
actuating a tote mover of the transfer station to move the second disk drive tote from the loading position to the presentation position for receipt of a disk drive retrieved from a test slot of the disk drive testing system; and
unloading, by the second disk drive tote, the disk drive from the disk drive testing system.

17. The method of claim 16, wherein the first disk drive tote comprises a tote body defining multiple disk drive receptacles configured to each house a disk drive.

18. The method of claim 16, further comprising:
opening a door to an open position, the door being pivotally attached to a transfer station housing of the transfer station and configured to provide closure of a tote supply opening defined by the transfer station housing;
placing the first disk drive tote in a preloading position on the door, the door being configured to receive and to support the first disk drive tote; and
closing the door by rotating the door to a closed position.

19. The method of claim 16, wherein the tote mover comprises a multi-axis actuator assembly configured to move the first disk drive tote between the loading position and the presentation position.

20. The method of claim 19, wherein the multi-axis actuator assembly comprises a vertical actuator, a horizontal actuator, and a pitch actuator.

21. The method of claim 19, wherein the multi-axis actuator assembly comprises:
a first linear actuator disposed on a side wall of the transfer station housing;
a lift carriage coupled to the first linear actuator;
a second linear actuator disposed on the lift carriage and pivotally coupled to a tote loading support configured to support at least the first disk drive tote; and
a third linear actuator pivotally coupled to both the second linear actuator and the tote loading support, the third linear actuator configured to rotate the tote loading support.

22. The method of claim 16, wherein the first disk drive tote is supported in the presentation position by one of multiple tote presentation support systems disposed on a transfer station housing of the transfer station.

23. The method of claim 22, wherein the multiple tote presentation support systems are arranged vertically with respect to each other.

24. The method of claim 22, wherein a tote presentation support system comprises first and second opposing pairs of tote support arms configured to be received by respective arm grooves defined by a tote body of the first disk drive tote.

25. The method of claim 24, wherein the arm grooves are releasably locked into a predetermined position on the tote support arms, thereby holding the first disk drive tote in the presentation position.

26. The method of claim 22, further comprising:
loading multiple disk drive totes onto the transfer station, wherein the multiple disk drive totes comprise at least the first disk drive tote and the second disk drive tote, and wherein each of the multiple disk drive totes houses disk drives, and wherein loading the multiple disk drive totes comprises:
sequentially placing each disk drive tote in the loading position on the transfer station; and
actuating the tote mover to move each disk drive tote to the presentation position at one of the multiple presentation positions for servicing by the disk drive testing system.

27. The method of claim 22, further comprising:
reading a tote marking on the first disk drive tote; and
actuating the tote mover to move the first disk drive tote from the loading position to the presentation position at one of the multiple tote presentation support systems based on the tote marking.

28. The method of claim 27, wherein the tote marking is read by a marking reader disposed on the tote mover.

29. The method of claim 27, wherein the tote marking comprises a barcode.

30. The method of claim 27, wherein the tote marking comprises a color marking.

31. The method of claim 27, further comprising assigning the first disk drive tote a function property that affects the usage of the first disk drive tote in the disk drive testing system.

32. The method of claim 31, wherein the function property is dynamically re-assignable during usage of the first disk drive tote in the disk drive testing system.

33. A transfer station for a disk drive testing system, the transfer station comprising:
a transfer station housing;
multiple tote presentation support systems disposed on the transfer station housing, a tote presentation support system configured to receive and to support at least a first disk drive tote in a presentation position for servicing by the disk drive testing system; and
a tote mover disposed on the transfer station housing and configured to (i) move at least the first disk drive tote between a loading position and the presentation position at one of the multiple tote presentation support systems, and (ii) perform one or more of first operations or second operations;
wherein the first operations comprise:
loading, by the first disk drive tote, multiple disk drives into the disk drive testing system; and
following retrieval of at least one of the multiple disk drives from the first disk drive tote:
unloading the first disk drive tote from the disk drive testing system; and
wherein the second operations comprise:
loading a second disk drive tote into the disk drive testing system; and
following receipt of at least one disk drive in the second disk drive tote:
unloading, by the second disk drive tote, the at least one disk drive from the disk drive testing system.

34. The transfer station of claim 33, further comprising:
a door pivotally attached to the transfer station housing and configured to provide closure of a tote supply opening defined by the transfer station housing;
wherein the door is further configured to pivot between (i) an open position, for receiving and supporting the first disk drive tote, and (ii) a closed position, for placing the first disk drive tote in the loading position.

35. The transfer station of claim 33, wherein the tote presentation support system comprises first and second opposing pairs of tote support arms configured to be received by respective arm grooves defined by a tote body of the first disk drive tote.

36. The transfer station of claim 33, wherein the tote mover comprises a multi-axis actuator assembly having a vertical actuator, a horizontal actuator, and a pitch actuator.

37. A transfer station for a disk drive testing system, the transfer station comprising:
a transfer station housing;
multiple tote presentation support systems disposed on the transfer station housing, a tote presentation support system configured to receive and to support a disk drive tote in a presentation position for servicing by the disk drive testing system;
a tote mover disposed on the transfer station housing; and
a tote loading support pivotally coupled to the tote mover and configured to receive and to support the disk drive tote, the tote loading support further configured to pivot and to move between first and second positions;
wherein the tote mover is configured to (i) move the tote loading support between a first position, for supporting the disk drive tote in a loading position, and a second position, for supporting the disk drive tote in the presentation position at one of the multiple tote presentation support systems, and (ii) load the disk drive tote into the disk drive testing system.

38. The transfer station of claim 37, wherein the tote mover comprises a multi-axis actuator assembly.

39. The transfer station of claim 38, wherein the multi-axis actuator assembly comprises a vertical actuator, a horizontal actuator, and a pitch actuator.

40. The transfer station of claim 38, wherein the multi-axis actuator assembly comprises:
a first linear actuator disposed on a side wall of the transfer station housing;
a lift carriage coupled to the first linear actuator;
a second linear actuator disposed on the lift carriage and pivotally coupled to the tote loading support; and
a third linear actuator pivotally coupled to both the second linear actuator and the tote loading support, the third linear actuator configured to rotate the tote loading support.

41. The transfer station of claim 37, wherein the first position of the tote loading support is substantially horizontal and the second position of the tote loading support is substantially vertical.

42. The transfer station of claim 37, further comprising a staging platform disposed on the transfer station housing and configured to receive the disk drive tote transferred from the tote loading support.

43. The transfer station of claim 42, wherein the staging platform is disposed on an opposite side of the transfer station housing of at least one of the multiple tote presentation support systems.

44. The transfer station of claim 42, further comprising a door pivotally attached to the transfer station housing and configured to provide a closure over the staging platform while in a closed position.

45. The transfer station of claim 37, further comprising:
a door pivotally attached to the transfer station housing and configured to provide closure of a tote supply opening defined by the transfer station housing;
wherein the door is further configured to pivot between (i) an open position, for receiving and supporting the disk drive tote, and (ii) a closed position, for placing the disk drive tote in the loading position.

46. The transfer station of claim 37, wherein the multiple tote presentation support systems are each disposed on a same side of the transfer station housing and are arranged vertically with respect to each other, each tote presentation support systems having a different elevation with respect to the others.

47. The transfer station of claim 37, wherein the tote presentation support system comprises first and second opposing pairs of tote support arms configured to be received by respective arm grooves defined by a tote body of the disk drive tote.

48. The transfer station of claim 37, wherein the disk drive tote comprises a tote body defining multiple disk drive receptacles configured to each house a disk drive.

49. A disk drive testing system comprising:
an automated transporter;
multiple racks arranged around the automated transporter for access by the automated transporter;
multiple test slots housed by at least one rack in the multiple racks, a test slot being configured to receive a first disk drive for testing; and
a transfer station arranged for access by the automated transporter, the transfer station comprising:
a transfer station housing;
multiple tote presentation support systems disposed on the transfer station housing, a tote presentation support system configured to receive and to support at least a first disk drive tote in a presentation position for servicing by the disk drive testing system; and a tote mover disposed on the transfer station housing and configured to (i) move at least the first disk drive tote between a loading position and the presentation position at one of the multiple tote presentation support systems, and (ii) perform one or more of first operations or second operations;

wherein the first operations comprise:
  loading, by the first disk drive tote, multiple disk drives into the disk drive testing system; and
  following retrieval of at least one of the multiple disk drives from the first disk drive tote:
    unloading the first disk drive tote from the disk drive testing system; and wherein the second operations comprise:
  loading a second disk drive tote into the disk drive testing system; and
  following receipt by the second disk drive tote of at least a second disk drive:
    unloading, by the second disk drive tote, the second disk drive from the disk drive testing system.

50. The disk drive testing system of claim 49, wherein the tote presentation support system comprises first and second opposing pairs of tote support arms configured to be received by respective arm grooves defined by a tote body of the first disk drive tote.

51. The disk drive testing system of claim 49, wherein the tote mover comprises a multi-axis actuator assembly having a vertical actuator, a horizontal actuator, and a pitch actuator.

52. The transfer station of claim 49, wherein the tote mover comprises:
  a first linear actuator disposed on a side wall of the transfer station housing;
  a lift carriage coupled to the first linear actuator;
  a second linear actuator disposed on the lift carriage and pivotally coupled to the tote loading support; and
  a third linear actuator pivotally coupled to both the second linear actuator and the tote loading support, the third linear actuator configured to rotate the tote loading support.

53. The transfer station of claim 49, wherein the transfer station further comprises:
  a marking reader configured to read a tote marking on the first disk drive tote; and
  wherein the tote mover is configured to move the first disk drive tote between the loading position and the presentation position at one of the multiple tote presentation support systems based on the marking read by the marking reader.

* * * * *